(12) United States Patent
Truglio et al.

(10) Patent No.: US 6,325,464 B2
(45) Date of Patent: Dec. 4, 2001

(54) ELECTROPNEUMATIC BRAKE CONTROL VALVE

(75) Inventors: James R. Truglio; Bryan M. McLaughlin, both of Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/779,585

(22) Filed: Feb. 9, 2001

Related U.S. Application Data

(63) Continuation of application No. 09/083,425, filed on May 21, 1998, which is a continuation of application No. 08/708,984, filed on Sep. 6, 1996, now Pat. No. 5,967,620.

(51) Int. Cl.[7] .................................................. B60T 13/00
(52) U.S. Cl. ................................... 303/7; 303/15; 303/36
(58) Field of Search ................................. 303/3, 15, 36, 303/20, 7, 37, 44, 66, 74, 77, 80, 86, 69

(56) References Cited

U.S. PATENT DOCUMENTS

| 2,897,011 | 7/1959 | Cotter . |
| 2,993,199 | 7/1961 | Browne et al. . |
| 4,052,110 | 10/1977 | Banker . |
| 4,344,138 | 8/1982 | Frasier . |
| 5,335,974 | 8/1994 | Klink . |
| 5,390,988 | 2/1995 | Shank . |
| 5,393,129 | 2/1995 | Troiani et al. . |
| 5,494,342 | * 2/1996 | Engle ........................ 303/3 |
| 5,503,467 | 4/1996 | Gaughan . |
| 5,676,431 | 10/1997 | McLaughlin et al. . |
| 5,722,736 | * 3/1998 | Cook ........................ 303/15 |
| 5,746,484 | 5/1998 | Gaughan et al. . |
| 5,967,620 | 10/1999 | Truglio et al. . |
| 6,213,565 | * 4/2001 | Hart ........................ 303/7 |

* cited by examiner

Primary Examiner—Robert J. Oberleitner
Assistant Examiner—Melanie Torres
(74) Attorney, Agent, or Firm—Barnes & Thornburg

(57) ABSTRACT

An ectropneumatic brake control valve unit capable of operating at the interface of the emergency brake portion or the service brake portion of a standard brake control valve as a retrofit unit or operating as a stand alone electropneumatic unit. The unit includes electric valves responsive to electrical signals and sensed brake pipe pressures to operate pneumatic valves to control the brake cylinder. The pneumatic valves are also operable independent of the electric control valves so as to allow braking with the electrical controls off or disabled. The unit can operate in combination with a complete brake control valve or with either or none of its emergency and service portions.

6 Claims, 13 Drawing Sheets

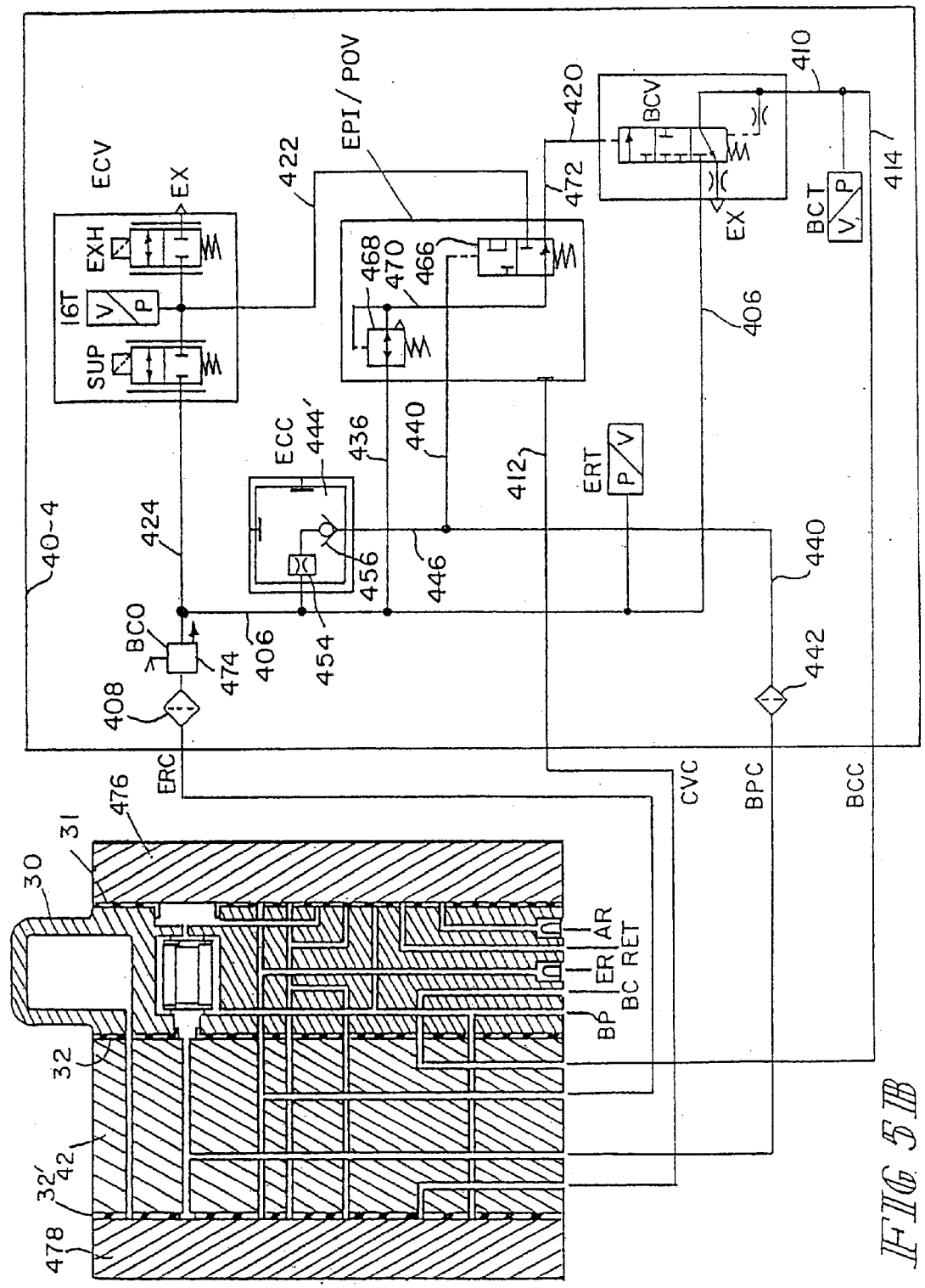

ELECTROPNEUMATIC BRAKE CONTROL VALVE

CROSS-REFERENCE

This is a Continuation of application Ser. No. 09/083,425 filed May 21, 1998, which is a continuation of 08/708,984 filed Sep. 6, 1996, now U.S. Pat. No. 5,967,620 issued Oct. 19, 1999.

BACKGROUND AND SUMMARY OF THE INVENTION

The present invention relates generally to electropneumatic ("EP") brake control valves and more specifically, to a retrofoot unit to convert a pneumatic brake control valve to electropneumatic brake control valve.

Electropneumatic brake control valves are well known in the passenger railroad art and the mass transit railroad art. Because the trains are short and are not involved generally in a mix and match at an interchange of different equipment, the ability to provide pneumatic and electrical control throughout the train has been readily available in the passenger and the mass transit systems. In freight trains, the trains may involve as much as 100 cars stretching over one mile or more. The individual cars may lay idle in harsh environments for up to a year without use. Also, because of the long distance they travel, the cars are continuously moved from one consist to another as it travels to its destination. Thus, the use of electropneumatic-pneumatic valves in the freight trains has been very limited.

A typical example of electropneumatic control on individual cars of a passenger train is U.S. Pat. No. 2,897,011 to Cotter. A magnetic application valve and release valve are connected with the brake pipe and a control reservoir to locally produce a pneumatic signal simulating a brake pipe signal to control the individual pneumatic control valve at each of the cars.

The major use of electropneumatic valves in freight trains have been at the locomotive. This is where electric power is available and the electrical interconnection is easy to achieve. Also, by the use of radio waves, the simultaneous braking at various positions along the train using slave locomotives with electro-pneumatic valves has also been used on freight trains. Recently, the American Association of Railroads ("AAR") has undertaken a massive study to determine an appropriate regime of incorporating electropneumatic valves on each of the cars of a freight train.

Various overlay systems have been proposed for use with control valves for freight trains. One is shown by U.S. Pat. No. 5,390,988 to Shank. This is an overlay system wherein an adapter is inserted to the service portion of a standard pneumatic brake control valve and electrically operates pneumatic valves to pneumatically control a standard brake control valve. The overlay is inserted between the service portion and its accelerated release valve portion. It is a pilot adaptor wherein the electropneumatic portion provides pneumatic signals to the control valve to operate in its normal matter. The only direct connection of the electropneumatic portion and the brake cylinder is for graduated release wherein the brake cylinder can be connected to exhaust through the electropneumatic valve.

Another overlay system is illustrated in U.S. Pat. No. 5,335,974 to Klink. This system also includes an electronic module and electropneumatic valves connected to a standard freight control valve. A pneumatic interface with transducers is provided between the service portion and the pipe bracket of a standard pneumatic brake control valve.

Another recent overlay system for a freight brake control valve is shown in U.S. Pat. No. 5,393,129 to Troiani et al. The two previously discussed patents to Shank and Klink provided adaptors or overlay to the service portion of the control valve or at the interface between the service portion and the pipe bracket so as not to change the connection of the train fluid system to the pipe bracket. Troiani et al. provides their overlay at the connection of the pneumatic system to the pipe bracket. The electropneumatic valve system is connected to the emergency reservoir and between the retainer port of the pipe bracket and the retainer.

A train inspection apparatus is disclosed in U.S. Pat. No. 2,993,199 to Browne et al. A pneumatic interface is provided between the emergency portion and the pipe bracket. This interface not only monitors the condition of the brake valve but also allows electropneumatic operation or an overlay of the pneumatic operation of the pneumatic brake valve. As with Shank and Klink, Brown et al. does not require modification of the connection of the fluid systems to the pipe bracket.

It is an object of the present invention to provide an electropneumatic retrofit unit which can be mated with either the emergency or service portion pipe bracket interface.

It is another object of the present invention to provide an electromagnetic retrofit unit for a pneumatic brake control valve which can operate as an overlay with a complete brake control valve or in combination with either the emergency or service portion, or as a complete stand alone.

An even further object of the present invention is to provide an electropneumatic unit for installation on new cars that is designed for electropneumatic operation only.

These and other objects are achieved by an electropneumatic unit for a pneumatic brake control valve connectable to an interface of the emergency brake portion or service brake portion of a standard pipe bracket as a retrofit or by itself. The unit includes an EP interface having an EP brake pipe port, EP brake cylinder port and an EP emergency reservoir port for interfacing with the corresponding ports at the brake pipe interface. An electrical control valve, which is connected to the EP emergency reservoir port, has a venting port and an output port. The electrical control valve selectively connects its output port to the venting port for releasing a brake or connects the EP emergency reservoir port to its output for applying the brake. A pneumatic brake cylinder valve is responsive to the output of the electrical control valve for selectively connecting the EP brake cylinder port with the EP emergency reservoir port or a venting port.

An isolation valve is connected to the brake cylinder valve for preventing the output of the electric control valve from inadvertently operating the brake cylinder valve. The isolation valve may be an electrically controlled valve or a pneumatically controlled valve. The isolation valve may connect the output of the electrical control valve to a venting port to thereby prevent the brake cylinder valve from connecting the EP brake cylinder port with the EP emergency reservoir port. The isolation valve may be responsive to a braking signal from the pipe bracket at an EP brake signal port or the brake pipe pressure, such that the pneumatic brake cylinder valve is responsive to the electrical control valve when there is either no brake signal at the EP brake signal port or the brake pipe is not being modulated for pneumatic braking. The isolation valve may also connect the EP brake signal port to the EP brake cylinder port when preventing the output of the electric control valve from operating the brake cylinder valve.

As an alternative, the isolation valve may also connect the EP brake signal port to the brake cylinder valve to operate the brake cylinder valve when preventing the output port of the electric control valve from operating the brake cylinder valve. As a further alternative, the unit could include a pneumatic selection valve to selectively connect the EP brake cylinder port either with the EP brake signal port or the output of the brake cylinder valve. The selection valve may select the higher of the two signals.

The control unit may also include a pneumatic emergency valve separate from the isolation valve for selectively connecting the EP emergency reservoir port to the brake cylinder valve in response to an emergency signal in the EP brake pipe port. The pneumatic emergency valve is responsive to brake pipe recharging to cause the brake cylinder valve to release the brakes. The emergency valve and the selection valve may be combined such that the emergency valve also disconnects the output port of the electric control valve from the brake cylinder valve in response to an emergency signal.

The unit may also include a charging choke and check valve which allows the EP brake pipe port to charge an emergency reservoirs and/or an auxiliary reservoir connected to EP emergency reservoirs port and EP auxiliary reservoir ports through the unit. The unit may be connected directly to and replace the service portion at the service portion interface to the pipe bracket or may be connected through an adaptor plate to the emergency portion interface to the pipe bracket. When the unit is connected to the service portion, the emergency portion may be connected to the pipe bracket and used as a vent valve. The emergency portion may be replaced with a vent valve. Alternatively, the emergency portion may also be removed and covered by a blank plate. The unit includes one or more transducers for sensing pressure in one of the EP ports and electronics on the unit for operating the electrical control valve and any other electrical valves in the unit.

The electropneumatic control unit may also be a separate stand alone unit in combination with an electropneumatic brake system independent of a pneumatic brake valve. In addition to the interface and the electrical control valve, it would include a pneumatic brake cylinder valve responsive to the output port of the electrical control valve for selectively connecting the EP brake cylinder port with the EP reservoir port or a venting port. This unit can also include a pneumatic emergency valve for selectively connecting the EP reservoir port to the brake cylinder valve in response to an emergency signal in the EP brake pipe port. As in the other embodiment, the emergency valve may also disconnect the output port of the electrical control valve from the brake cylinder valve in response to an emergency signal in the EP brake pipe port.

The unit may also include a release interface having a first and second brake cylinder port connected respectively to the EP brake cylinder port and to the brake cylinder valve or the selection valve for mating with respective ports on a manual release valve to be mounted at the release interface. Thus, the manual release valve can release the brakes without draining reservoir pressure. The release interface also includes a reservoir port interface so as so allow the manual release valve to also discharge the reservoirs.

In another embodiment, the electropneumatic control unit would include the EP interface and the electrical control valve in combination with the pneumatic isolation valve. The pneumatic isolation valve is responsive to pressure in the EP brake pipe port for selectively connecting the EP brake signal port and the EP brake cylinder port when the EP brake pipe pressure signals a brake application. The pneumatic isolation valve also connects the output of the electrical control valve to the EP brake cylinder port when the EP brake pipe pressure signals the brake release. Alternatively, the pneumatic isolation valve may be responsive to pressure in the EP brake signal port and at the output port of the electrical control valve for selectively interconnecting the EP brake signal port and the EP brake cylinder port when the EP brake signal port pressure signals and brake application. The pneumatic isolation valve connects the EP emergency reservoir port to the EP brake cylinder port when the EP brake signal ports pressure signals a brake release and the output port of the electrical control valve signals a brake application.

Other objects, advantages and novel features of the present invention will become apparent from the following detailed description of the invention when considered in conjunction with the accompanying drawings.

BRIEF DESCRIPTION OF THE DRAWINGS

FIGS. 5A and 5B are schematics of a fourth embodiment of an electropneumatic retrofit unit for a pneumatic brake control valve connected at the emergency interface to the pipe bracket for use in combination with a complete brake control valve and only the pipe bracket respectively.

DETAILED DESCRIPTION OF THE PREFERRED EMBODIMENTS

Figure 1:
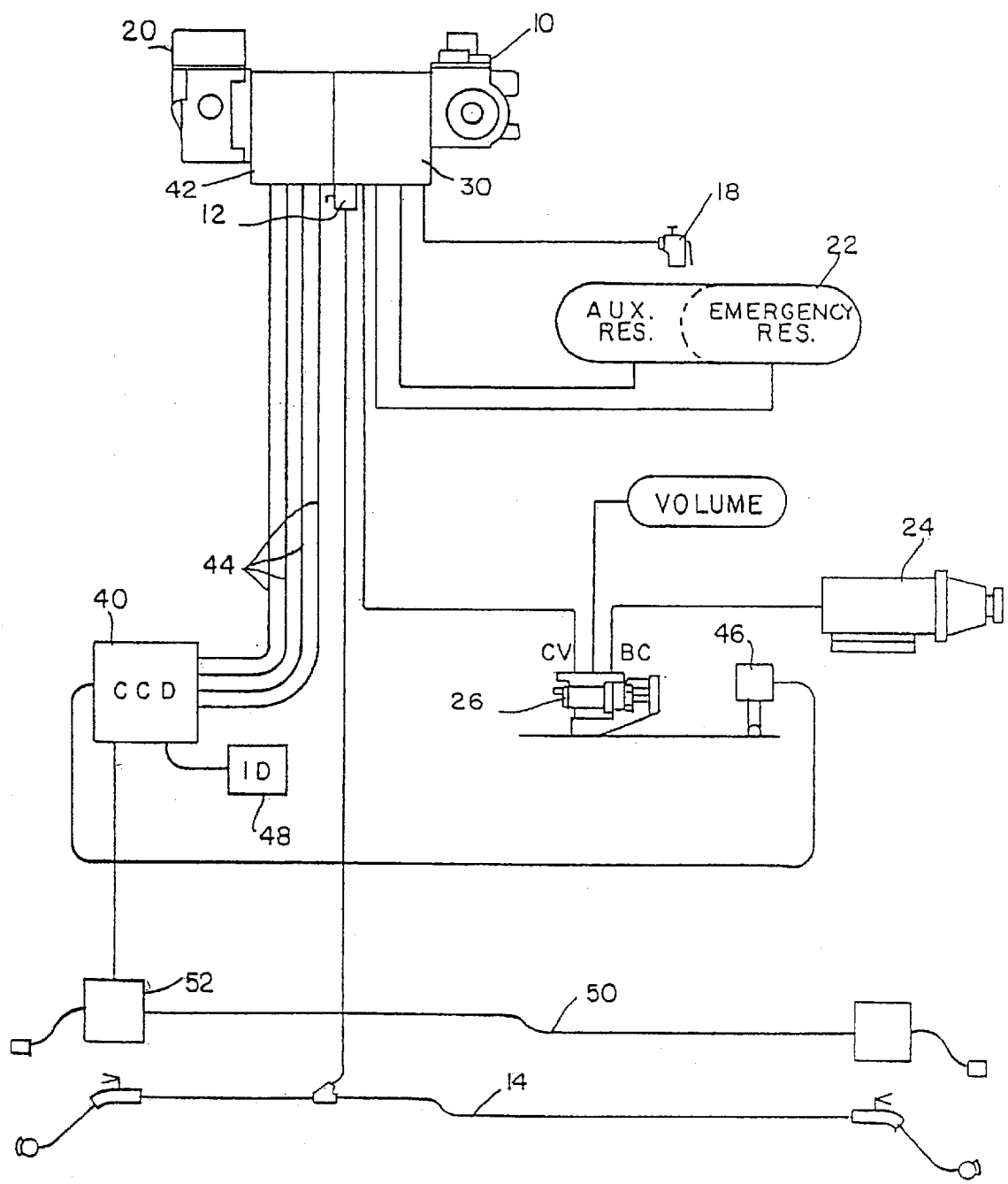
FIG. 1 is a schematic of a train brake system on a car incorporating the principles of the present invention.

As illustrated in FIG. 1, the train brake system includes a brake control valve having a service portion 10 and emergency portion 20 connected to a pipe bracket 30. A cut-off cock 12 connects brake pipe 14 to the pipe bracket 30 at port BP. A retainer valve 18 connected to exhaust is connected to pipe bracket 30 at retainer port RET. A combined reservoir 22, having an auxiliary AUX RES and an emergency reservoir EMER RES are connected to respective ports AR and ER of pipe bracket 30. A brake cylinder 24 is connected through empty/load device 26 to brake cylinder port BC. The elements described so far are part of a normal brake system. The service portion 10, emergency portion 20 and pipe bracket 30 are standard parts, for example, a DB-60 from New York Air Brake Corporation or Knorr Bremse AG. Similarly, they may be a ABDX or other AAR approved brake valves.

Although the schematic in FIG. 1 shows the service portion 10 and the emergency portion 20 on opposing faces of pipe bracket 30, the invention to be described can also be used on a single sided pipe bracket where the service portion 10 and the emergency portion 20 are adjacent each other on a single face of the pipe bracket 30. It should also be noted that the retrofit apparatus of the present invention may also be used with non-AAR valves and as stand alone units without the pipe bracket 30.

The retrofit unit of the present invention includes a car control device (CCD) 40 designed to provide electropneumatic brake control on either a new or existing freight cars. An adaptor plate 42, connected between the emergency portion 20 and the pipe bracket 30 is connected pneumatically to the car control device 40 by passages 44. The adaptor plate 42 provides the interconnection between the pipe bracket 30 and the emergency portion 20 as well as pneumatic access to certain passages. Adaptor plate 42 includes a brake signal port CVC which conveys the brake signal from the emergency portion 20 to the pipe bracket 30 for the brake cylinder 24. It also includes a brake pipe port BPC connected to the brake pipe passage in adaptor plate 42. The emergency port ERC is connected to a passage in adaptor plate 42 connected to the emergency reservoir. The brake cylinder port BCC in the adaptor plate 42 is connected to a passage connected to the brake cylinder port at the interface with the pipe bracket 30.

An electrical or electronic empty/load device 46 is also connected to the car control device 40. This provides a feedback to the car control device 40 such that it can make appropriate decisions on the appropriate braking in combination with the pneumatic empty/load device 26 or if the empty/load device 26 is not on the car. A car identification device 48 is also connected to the car control device 40. This provides identification in a reporting system for each of the individual cars. The car control device 40 is connected to trainline cable 50 through junction box 52. The train cable 50 is a combined communication and power line running through the train. The communication and power line may be separate lines or one combined line.

Figure 2A:
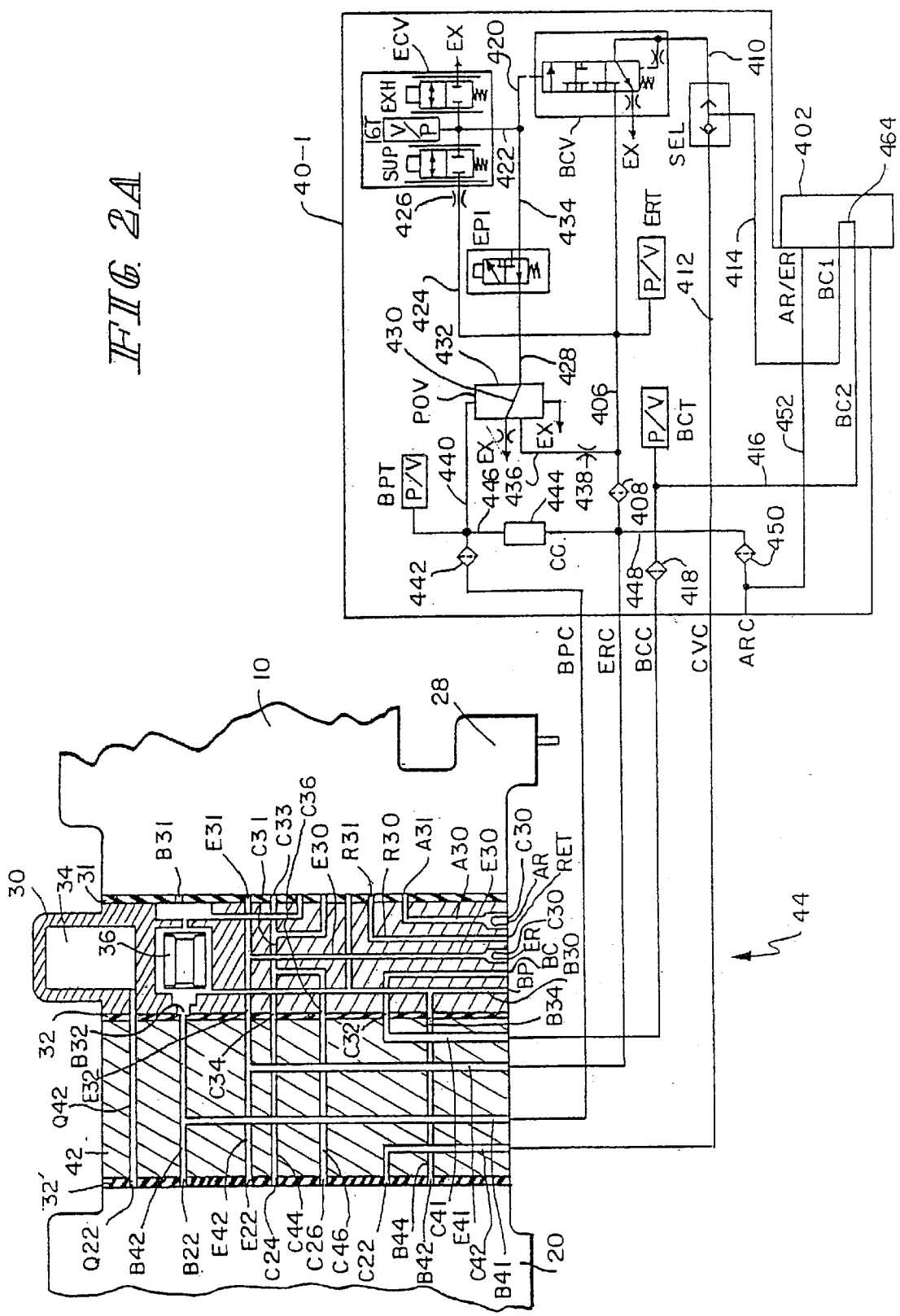
FIGS. 2A and 2B are schematic representations of a first embodiment of an electropneumatic retrofit unit connected at the emergency and the service interfaces of a pipe bracket pneumatic brake control valve respectively.
Figure 2B:
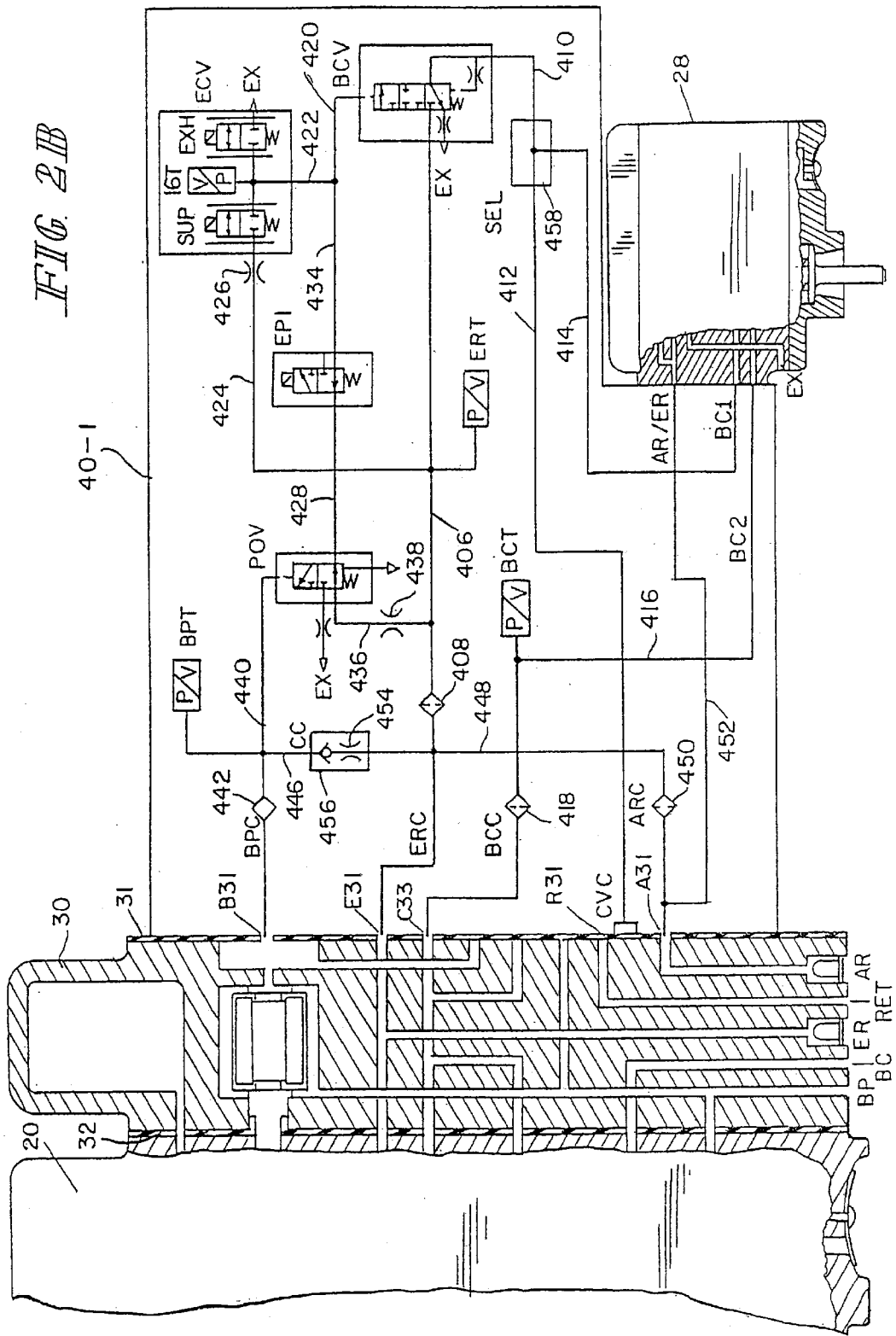
Figure 2C:
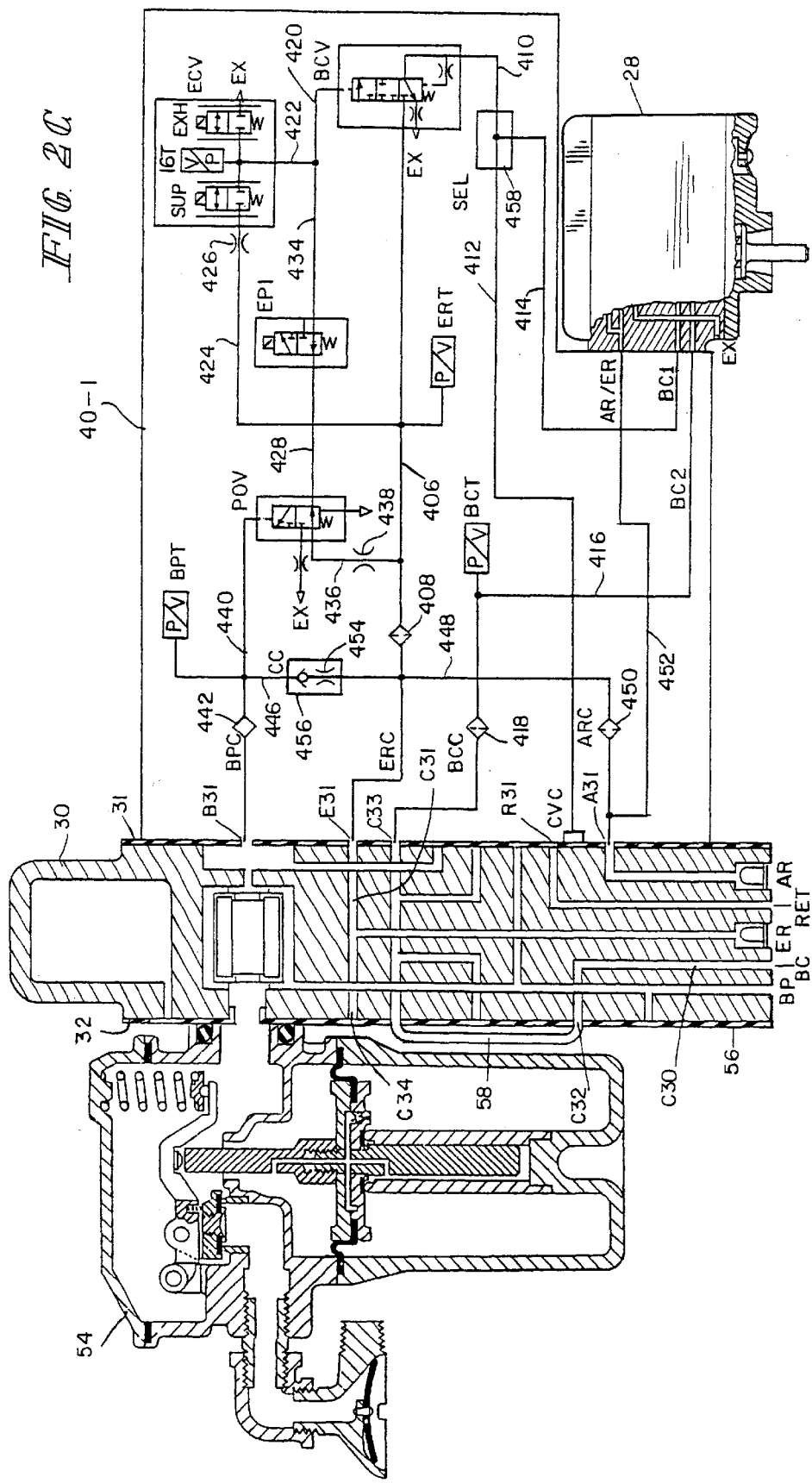
FIGS. 2C and D are schematic representations of electropneumatic unit as a stand alone without connection to any portion of a pneumatic brake control valve with a standard pipe bracket and an electropneumatic pipe bracket respectively.
Figure 2D:
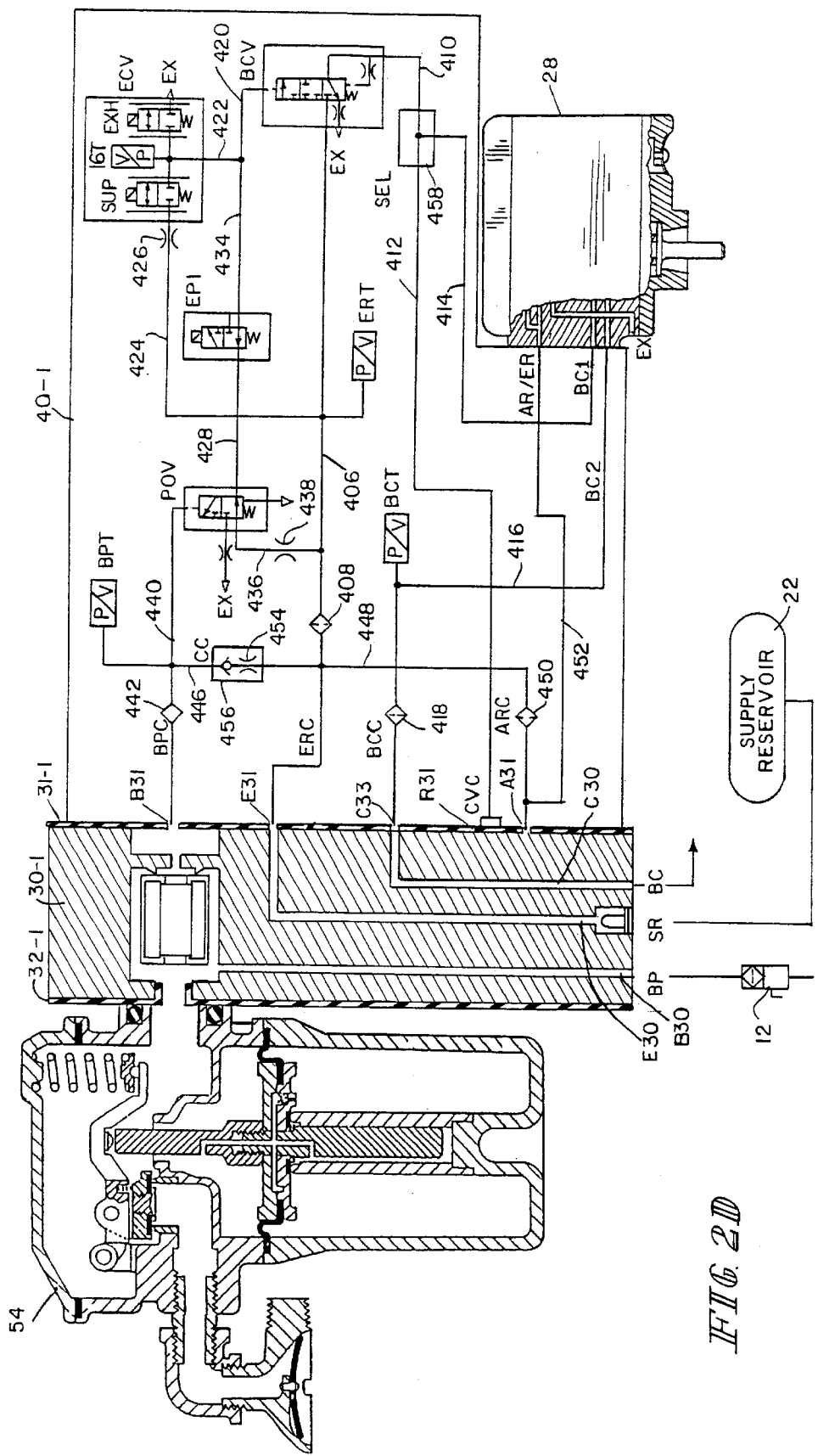

Although the car control device 40 is shown connected to the adaptor plate 42 by passages 44, it may be mounted directly to or be an integral part of the adaptor plate 42. As described in some of the preferred embodiments, the EP ports on the car control device 40 are configured so as to mate directly with the interface ports on the service side of the pipe bracket 30. This allows the car control device 40 to replace a service portion 10 and be mounted directly to the pipe bracket 30. The car control device 40 can be used by itself without the emergency portion 20 or in combination with the emergency portion 20 also mounted directly to the pipe bracket 30. When the car control device is used by itself, it may be used with a standard pipe bracket 30 or a special pipe bracket 30-1 as shown in FIGS. 2C and 2D respectively with a brake pipe vent valve. The adaptor plate 42 allows the car control device 40 to be used with a complete brake control valve having service portion 10 and emergency portion 20.

The car control device 40 provides pneumatic control of the brake cylinder pressure when the brake pipe pressure is used as a supply line. The car control device 40 can also electropneumatically control the brake cylinder pressure by providing the required functions of the service portion when the brake pipe 14 is used as a control pipe. When the car control device 40 is used with the complete brake control valve having service portions 10 and emergency portions 20, the car control device 40 provides pneumatic or electropneumatic control of the brake cylinder pressure. If the brake pressure is reduced at an emergency brake rate, the car control device 40 will allow conventional brake operation using the service portion 10 and the emergency portion 20. This design of the car control device 40 allows it to operate either in a conventional fully pneumatic train or in a train having only electropneumatic brakes. Also, it allows pneumatic back up if the car control device fails or is without power.

When the car control device 40 substitutes for the service portion 10, it provides for charging of the emergency and the auxiliary reservoirs. The car control device 40 also provides electropneumatic control of the brake cylinder pressure. If the brake pipe is reduced at a service or an emergency rate or increased for a release, the car control device 40 senses these pressure changes and simulates the function of the service portion 10 in controlling the brake cylinder pressure. When used in combination with the emergency portion 20, it acts as a back up for the emergency portion 20 or the emergency portion 20 acts as a brake pipe vent valve. When the car control device is used as a service portion or combined service/emergency portion and in a train not having electropneumatic power or communication, the car control device will require a power source on the car to electrically operate. Otherwise it will provide a more basic pneumatic response.

The car control device 40 has been designed specifically for retrofitting to a standard pipe bracket 30. The specific elements and logic are also usable with the simpler pipe bracket and in a non-retrofit environment as illustrated in FIG. 2D.

Various embodiments of the car control device 40 will be described in the following figures. Figure A will reflect the car control device 40 used with a complete pneumatic control valve having a service portion 10 and an emergency portion 20. Figure B of the same figure number will be the car control device partially modified to operate with less than the complete pneumatic control valve in combination with either the emergency portion 20 or with neither the emergency portion 20 nor the service portion 10. Figures C and D show the combination of car control device and vent valve.

To aid in understanding the various passages within the control valve, the brake pipe passage is represented by a "B", the brake cylinder passages by a "C", the emergency reservoir passages by an "E", the retainer passage by an "R", the auxiliary reservoir passage by a "A", and the control valve or brake signal passage from the emergency portion for the brake cylinder by a "V". The passages in the service portion 10 will have a number in the teens, the passages in the brake pipe 30 will have numbers in the 30's, the passages in the emergency section 20 will have numbers in the 20's, and the passages in the retrofit adaptor plate 42 will have reference numbers in the 40's.

As illustrated in the figures, the pipe bracket 30 includes a service portion interface 31 and an emergency portion interface 32. Each interface having interface ports connecting the brake pipe port BP brake cylinder port BC, the emergency reservoir port ER, retainer port RET and auxiliary reservoir port AR to interface service ports at face 31 and interface emergency ports at interface 32.

The brake pipe port BP is connected by passage B30 to a filter 36 in the pipe bracket 30. The filtered brake pipe air is provided to a service interface port B31 and an emergency interface port B32. The brake pipe passage B30 is also provided to the emergency portion 20 for venting at interface port B34.

The brake cylinder port BC is connected by passage C30 to the emergency portion brake cylinder interface port C32. The brake cylinder passage C31 in the pipe bracket 30 connects the brake cylinder interface port C33 on the service interface 31 to the brake cylinder interface ports C34 and C36 on the emergency interface 32. This interconnects the brake cylinder control signals between the service portion 10 and the emergency portion 20. The emergency reservoir port ER is connected by passage E30 to emergency reservoir interface port E31 on the service interface and E32 on the emergency interface. The retainer port RET is connected by passage R30 to the retainer interface port R31 on the service interface. The auxiliary reservoir port AR is connected by passage A30 to the auxiliary interface port A31 on the service interface. The pipe bracket 30 includes a quick action chamber 34 connected to a quick action port Q32 at the emergency reservoir interface. As previously described, the pipe bracket 30 and the passages just described are for a standard pipe bracket for AAR brake control valves.

The adaptor plate 42 provides access to the brake pipe emergency reservoir, brake cylinder and brake control signal for the car control device 40 while providing continual interface between the pipe bracket 30 and the emergency portion 20 at interfaces 32 and 32' respectively. The adaptor plate 42 includes a quick action chamber passage Q42 connecting quick action port Q32 at the pipe bracket to quick action port Q22 at the emergency portion 20. Brake pipe passage B42 provides an interconnection between the brake pipe ports B32 and B22 at the emergency portion and brake pipe respectively. Brake pipe passage B42 is also connected to the brake pipe port BPC for the car control device 40 by passage B41. Emergency reservoir passage E42 connects the emergency reservoir port E32 at the pipe bracket interface to emergency reservoir port E22 at the emergency portion interface. Passage E41 connects passage E42 to the emergency reservoir port ERC for the car control device 40. Passage C44 connects brake cylinder port C34 at the pipe bracket to brake cylinder port C24 at the emergency portion. Brake cylinder passage C46 connects brake cylinder port C36 at the pipe bracket interface to brake cylinder port C26 at the emergency interface. Brake pipe passage B44 connects brake pipe port B34 at the pipe bracket interface to brake pipe port B24 at the emergency interface. Brake cylinder passage C41 connects the brake cylinder port C32 at the pipe bracket interface to brake cylinder port BCC for the car control device 40. Brake cylinder or brake signal passage B42 connects brake cylinder port C22 at the emergency portion to brake cylinder or brake signal port CVC for the car control device 40.

As in the previous figure, the service portion 10 and the emergency portion 20 are only shown in silhouette. Service portion 10 is shown with a standard manual release portion 28 mounted thereon.

The car control device 40 has a brake pipe port BPC, an emergency reservoir port ERC, a brake cylinder port BCC and a brake signal port CVC connected by passages 44 to the respective ports on the adaptor plate 42. An auxiliary reservoir port ARC is also provided on the car control device 40. The brake pipe port, emergency reservoir port, brake cylinder port and the emergency reservoir port are configured and positioned so as to mate directly with respective ports on the service interface 31 of the pipe bracket 30 so as to be used with the emergency portion 20 as shown in FIG. 2B. Alternatively, the port configuration could be configured to directly mount to the emergency interface 32 and a blanking plate provided on the service interface. Additionally, the car control device 40 includes a combined emergency auxiliary reservoir and an emergency reservoir port AR/ER and first and second brake cylinder ports BC1 and BC2 at a release interface to mate with manual release valve 28 as shown in FIG. 2B. In FIG. 2A, a release portion blanking plate 402 is shown mounted blanking the port AR/ER. The passage 404 interconnects brake cylinder ports BC1 and BC2 at the release portion interface.

The overall operation of the car control device 40 is to use the pressure in the emergency reservoir at port ERC to provide pressure at the brake cylinder port BCC to control the braking by itself or as an alternative, to use the brake signal at port CVC from the brake control valve. The car control device 40 is responsive to the signal from the brake control valve at port CVC or the brake pipe port BPC to determine whether to use an electrical control signal or the pneumatic signal from the brake control valve to operate the brake cylinder. In some embodiments, the brake pipe pressure at BPC is used to pneumatically control valve elements. In other embodiments, the pressure at the brake pipe port BPC is monitored electrically and thus, the control is electropneumatic of the valves.

The first embodiment of the car control device 40-1, as shown in FIGS. 2A and 2B, include a brake cylinder valve or relay BCV connected to the emergency reservoir port ERC via passage 406 and filter 408. The output of the brake cylinder valve BCV is connected by passage 410 to a select valve SEL which receives a second input from the brake signal port CVC via line passage 412. The brake cylinder valve BCV selectively connects and disconnects the emergency reservoir port ERC to the select valve SEL. The output of the select valve SEL is provided to the brake cylinder port BCC via passages 414, 404 and 416 and screen 418. The select valve SEL selects the higher of the signals from the brake cylinder valve BCV and the brake signal port CVC and is illustrated as a double check valve. Other types of valves which select the higher of the two signals may be used.

The brake cylinder valve BCV is illustrated on a three-position valve spring biased to the position shown wherein its output, the passage 410, is connected to vent or exhaust EX and the input from the emergency reservoir port ERC on passage 406 is blocked. The pilot pressure in passage 420 forces the brake cylinder valve BCV against the spring to two of its other positions. In the middle position, all three ports of the valve BCV are blocked. On a high enough pressure signal, in the third position, the output 410 of the valve BCV is connected to the emergency reservoir port ERC through passage 406. Thus, in the position shown with exhaust in passage 410, the select valve SEL selects the brake signal on port CVC for the brake cylinder port BCC. This allows the pneumatic brake control valve to control the brake cylinder.

Figure 3A:
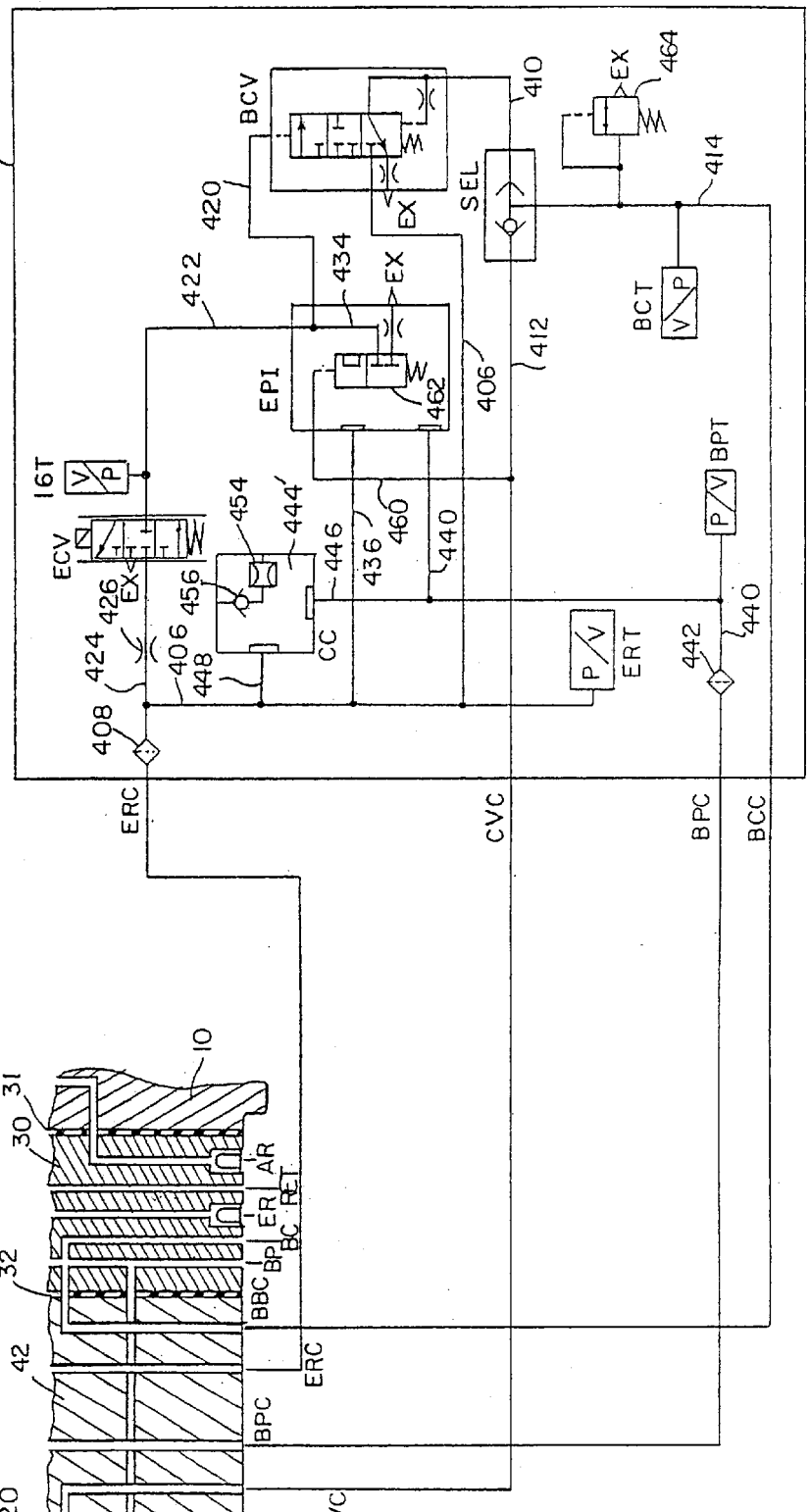
FIGS. 3A and 3B are schematic representations of a second embodiment of an electropneumatic retrofit for a pneumatic brake control valve connected at the emergency portion of the interface to the pipe bracket in combination with a complete brake control valve and only the pipe bracket respectively.
Figure 3A:
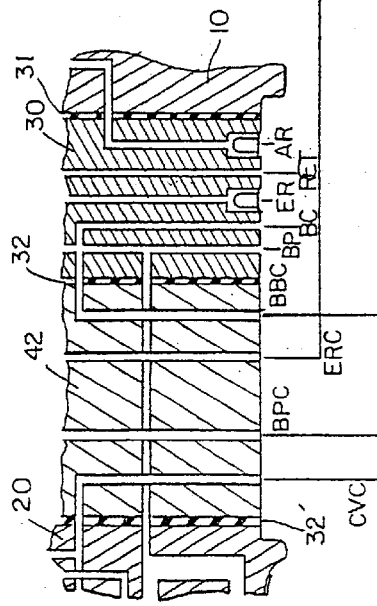

An electrical control valve ECV is connected to the pilot line 420 of the brake cylinder valve BCV via passage 422. The electrical control valve ECV is illustrated as including a supply magnetic valve SUP and an exhaust magnetic valve EXH to selectively connect its output port or passage 422 to either the exhaust EX or to the supply pressure which is from the emergency reservoir via passage 424 and 406. The supply valve SUP and the exhaust valve EXH are bias to their blocked position. Thus, for an electrical off or electrical failure the electrical control valve ECV will not provide a signal on passage 420 and the brake cylinder valve BCV will remain in its inoperable position having passage 410 vented. The electrical control valve ECV may also be a three-way proportional magnetic valve as illustrated in FIG. 3A.

These ECV valves are controlled by a microcomputer in order to apply, maintain or release the brake cylinder pressure. The brake cylinder valve BCV is preferably a relay valve and controls the brake cylinder pressure to amount equal to the pressure applied to its pilot port at 420. The magnetic valves are controlled with a modulated or analog type of signal which allows the valves to be opened or closed proportionally rather than only fully opened or fully closed by using digital or on/off control signals. The straight lines on the port faces signify a proportional value. Alternatively, digital or on/off valves may also be used.

An isolation valve EPI is used to isolate electropneumatic control of the brake cylinder valve BCV. The isolation valve EPI is a two-position valve spring biased to connect its input from passage 428 from output passage 434 connected to the pilot passage 420 of the brake control valve BCV. The passage 430 in blanking plate 432 in a pilot operated valve POV connects passage 428 to exhaust. The purpose of the pilot valve POV will be discussed with respect to FIG. 2B. The isolation valve EPI is controlled by the microcomputer. During electrical operation of the car control device 40, the isolation valve EPI is positioned in its closed or energized position cutting off the exhaust from passage 430 in pilot port 420. This allows the electrical control valve ECV to control the brake cylinder valve BCV.

To allow pneumatic operation of the brakes using the brake control valve or when the electrical of the brakes is to be cut out, the isolation valve EPI is de-energized into its opened position wherein the exhaust EX is provided to the pilot passage 420 causing brake cylinder valve BCV to assume the state illustrated in FIG. 2A. The primary function of the isolation valve EPI is to prevent the car brakes from inadvertently applying during conventional service or when the car's electrical control is cut out due to any leakage through the electrical control valve EVC.

The emergency reservoir port ERC is connected to one of the blanked ports of the pilot valve POV via passages 406, 436 and choke 438. The brake pipe port BPC is connected via passage 440 and screen 442 to the blanked pilot port of pilot valve POV. The operation of the pilot valve POV will be described with respect to FIG. 2B. A charging check and choke valve CC, illustrated in FIG. 2B, has a blanking plate 444 in FIG. 2A and is connected to the brake pipe port BPG and passage 440 by passage 446. The charging check and choke CC is also connected via passage 448 to the emergency reservoir port ERC and to the auxiliary reservoir port ARC via screen 450. Passage 452 connects the emergency reservoir port ERC and auxiliary reservoir port ARC to the release valve blanking plate 402. The ability to charge the emergency reservoir and the auxiliary reservoir via the brake pipe and charging check and choke CC will be described with respect to FIG. 2B.

Car control device 40 includes brake pipe transducer BPT connected to passage 440, brake cylinder transducer BCT connected to passage 416, emergency reservoir transducer ERT connected to passage 406 and a port 16 transducer 16T connected to the output 420 of the electric control valve ECV. The microcomputer of the car control device 40 uses these measured values from the pressure/voltage transducers to perform the required operation of the electric portion of the control device.

The operation of the car control device 40-1 illustrated in FIG. 2A will now be described.

Charging

During brake pipe charging, brake pipe pressure enters brake pipe port BP on the pipe bracket 30 and flows to the service portion 10 and emergency portion 20 which operate in their typical manner. As brake pipe pressure is increased, the brake control valve charges its auxiliary and emergency reservoirs. As the emergency reservoir pressure increases, air flows from port ERC of the adaptor plate 42 to port ERC of the car control device 40-1. Pressure from the emergency reservoir port ERC flows via passages 406 and 424 to the electrical valve ECV where it is blocked and via 406 to the brake cylinder valve BCV where it is also blocked.

Brake pipe pressure from brake pipe port BP of the pipe bracket 30 also flows from the adaptor plate port BPC to the car control device brake pipe port BPC where it is blocked at the charging check/choke CCC and the pilot valve POV. In the release/charging position, the brake control valve's brake cylinder pressure at port CVC is zero. Thus, the pressure on adaptor plate 42 and the car control device 40-1 at port CVC are zero. The isolation valve EPI is positioned by activation to disconnect passage 420 from exhaust and allows the electrical control valve ECV to control passage 420 of the brake cylinder valve BCV. The electrical control valve ECV in its release position, controls its output to zero psi and the brake cylinder valve BCV controls its output 422 to zero PSI and therefore the brakes remain released with zero psi at brake cylinder port BCC.

Conventional Service Brake Application

For conventional pneumatic brake application, the train operator reduces the brake pipe pressure in a normal manner. The brake control valve provides a corresponding output to the port CVC of the adaptor plate 42 to the car control device 40. The microcomputer of the car control device senses the drop in brake pipe pressure by brake pipe transducer BPT and maintains the isolation valve EPI de-energized such that passage 420 of the brake cylinder valve BCV remains exhausted into the position shown in FIG. 2A. The brake control valve BCV connects passage 410 to the select valve SEL to exhaust and allows the braking signal on port CVC from the brake control valve to be transmitted via passages 414, 404 and 416 to the brake cylinder port BCC of the adaptor 42 and subsequently to the brake cylinder port BC of the pipe bracket 30.

Electropneumatic Service Brake Application

For an electropneumatic brake application, the train operator maintains the brake pipe pressure at a constant value, at a fully charged level, and commands an electropneumatic brake application from the locomotive. The microcomputer on each car control device 40 receives the electric brake application signal. The isolation valve EPI is activated and maintained activated during electropneumatic brake application. The activated isolation EPI disconnects passages 434 and 420 from exhaust and blocking passage 434. The electric control valve ECV is energized and a corresponding amount of emergency reservoir pressure from port ERC via passages 406, 424, choke 426, passage 422 is supplied to the control passage 420 of the brake cylinder valve BCV. The brake cylinder valve BCV provides an amount of emergency reservoir pressure equal to that on passage 420 to the select valve SEL via passage 410 and on to the brake cylinder port VCC via passage 414, 404 and 416. Since the brake pipe is fully charged, there is zero pressure at the brake signal port CVC.

In this method, either a full brake application or a graduated brake application can be achieved. The transducer 16T provides electric feedback to the microcomputer which controls the electric control valve ECV to provide a pressure corresponding to the brake cylinder pressure desired. As is well known, the amount of brake cylinder pressure applied depends on the train brake command as well as the car weight. As shown in FIG. 1, the microcomputer of the car control device 40 may receive an electric feedback signal of the car weight from sensor 46.

Emergency Brake Application

For an emergency brake application, the train operator can either make an emergency rate of emergency pipe reduction or an electropneumatic emergency brake application. For a pneumatic emergency brake application, the car control device will operate as described for a regular pneumatic brake application. The isolation valve EPI is deenergized and prevents the brake cylinder valve BCV from providing a pressure signal to the select valve SEL. The emergency brake signal from the brake control valve at port CVC is provided via passages 412, 414, 404 and 416 to the brake cylinder port BCC.

For an electropneumatic emergency application, the operation is the same as described for an electropneumatic service operation. The isolation valve EPI is activated and the electric control valve ECV is operated to produce the desired control pressure over passages 422 and 420 to control the brake cylinder valve BCV to provide an appropriate pressure over passage 410 to the select valve SEL. The signal is provided via passages 414, 402 and 416 to the brake cylinder port BCC.

If the brake pipe experienced an emergency rate of brake pipe reduction while the electropneumatic control using the electric control valve ECV is making a service application, the car control device 40-1 will go into an emergency application mode. The microcomputer will sense, by the brake pipe transducer BPT, that there is an emergency rate of reduction and will maintain the valve ECV in its supply condition to maintain the brake cylinder valve BCV on to provide an emergency application build up at the brake cylinder port BCC. If the electrical control system cannot build up the pressure fast enough, the pneumatic brake signal from the brake control valve at port CVC will be selected by the select valve SEL to build up an emergency pressure in the brake cylinder at brake cylinder port BCC. Thus, the brake control valve and the electropneumatic portion of the car control device 40 operate in parallel, with the higher of the two signals provided by select valve SEL, to build up the pressure in the brake cylinder in response to an emergency rate of reduction in the brake pipe.

Conventional Release

In order to make a conventional pneumatic brake release, the train operator increases the brake pipe pressure in the normal manner. The brake control valve releases the brake cylinder by venting the brake cylinder port BC. This results from connecting the brake signal port CVC to the atmosphere. The rise in the pressure in the brake pipe is sensed by transducer BPT and used by the microcomputer to assure that the isolation valve EPI is deactivated such that the control port in passage 420 for the brake cylinder valve BCV is connected to exhaust. This provides protection against any leakage through the electrical control valve ECV from causing undesired brake application while the car is being operated in a conventional release mode. Thus, both sides of the select valve SEL is connected or vented to exhaust.

Electropneumatic Brake Release

In an electropneumatic brake release, the train operator retains the brake pipe pressure at a constant level and electrically commands a brake release from the locomotive. The microcomputer in the car control device 40-1 receives the electric brake release signal and operates its electric control valve ECV. The electric control valve ECV exhausts a corresponding amount of emergency reservoir pressure from passages 422 and 420. This drop in pressure moves the brake cylinder valve BCV from its center block or lap position to its bottom position connecting passage 410 to exhaust. This will cause brake cylinder pressure from brake cylinder port BCC to be reduced through passages 416, 404, 414 through select valve SEL and passage 410. The signals from brake cylinder transducer BCT and the pilot brake control signal on transducer 16T are used by the microcomputer to control the desired reduction in pressure. Once the desired reduction is achieved, the brake cylinder valve BCV is moved to its centered block position. In this manner, either a full brake release or a graduated brake release can be achieved electropneumatically.

The car control device 40-1 in FIG. 2A may be used as a direct replacement for the service portion 10 of the brake control valve as illustrated in FIG. 2B or without service portion 10 or emergency portion 20 as illustrated in FIG. 2C and D. Referring to FIG. 2B, the blanking plate 444 is removed from the charging check CC and replaced with a charging choke 454 and a charging choke valve 456. This allows the brake pipe pressure at brake pipe port BPC to charge the emergency reservoir at port ERC and the auxiliary reservoir at port ARC.

The blanking plate 432 for the pilot valve POV is removed and a pilot valve POV is provided to pneumatically sense an emergency pressure in the brake pipe and initiate a pneumatic brake application. The pilot valve is responsive to the brake pipe port pressure at BPC to selectively connect the isolation valve EPI to either exhaust or to the emergency reservoir port ERC. When the brake pipe pressure is greater than approximately 50 PSI, for example, the pilot valve POV connects passage 428 and the isolation valve EPI to exhaust. When the brake pipe pressure is less than approximately 50 PSI, the pilot valve POV connects the emergency and auxiliary reservoirs to passage 428 of the isolation valve EPI through a choke 438 and passages 436, 428.

Thus, when the brake pipe pressure is above approximately 50 PSI, the pilot valve POV connects passage 428 to exhaust and the electropneumatic control operating on brake cylinder valve BCV is the same as that described for FIG. 2A. When the brake pipe pressure is reduced below 50 PSI, and the isolation valve EPI is deactivated, reservoir pressure is provided to passage 420 to operate the brake cylinder valve BCV to apply reservoir pressure to the select valve SEL and subsequently to the brake cylinder port BCC to apply the brakes. In this manner, a pneumatic emergency brake application is available if the brake pipe has been reduced sufficiently and if the car control device's electronics has been turned off. This condition occurs when the train is parked or when the car control device's electronics fail.

Another modification is that a blanking plate 458 has replaced the select valve SEL such that passage 410 is always connected to passage 414 and through 416 to the brake cylinder port BCC. Passage 412 is also connected to passage 414 but the brake signal port CVC is blanked at the service interface 31 of the brake pipe 30.

The blanking plate 402 is removed and a manual release valve 28 is connected to the ports AR/ER, BC1 and BC2. As is well known, the ports BC1 and BC2 are interconnected through the release valve 28. The manual release valve 28 allows manual release of the brake cylinder by connecting the port BC2 to exhaust without draining the reservoirs.

Also, the manual release 28 can also connect the auxiliary and emergency reservoirs through port AR/ER to exhaust.

The car control device 40-1 replace the service section 10 and provides an interface between the release valve 28 and the pipe bracket 30. The position of the ports BPC, ERC, BCC and ARC mate directly with the corresponding port B31, E31, C33 and A31 on the service interface 31 of the pipe bracket 30. No adaptor plate is needed. The brake signal port CVC is blanked at the interface 31 as is the retainer port R31.

Charging

During brake pipe charging, the brake pipe pressure at port B31, BPC flows through the charging check valve and choke CC to charge both the auxiliary reservoir and the emergency reservoir through ports ARC/A31 and ERC/E31. As the reservoir pressure increases, air flows through passage 406 to the brake cylinder valve BCV and the electric control valve ECV where it is blocked. Brake pipe pressure also flows on passage 440 of the pilot port of pilot valve POV which, at approximately 50 PSI, moves from the position shown to connect isolation valve EPI to exhaust. If BP is below 50 PSI, the brakes will be applied. Reservoir pressure in passage 436 through pilot valve POV passage 428, deenergized isolation valve EPI and passage 434 to the control port passage 420 of brake cylinder valve BCV prior to the brake pipe pressure exceeding approximately 50 PSI operates the brake cylinder valve BCV to its third position which would connect the emergency reservoir or auxiliary reservoir to the brake cylinder port BCC. Alternatively, the microcomputer would activate isolation valve EPI and electrical control valve ECV to apply reservoir pressure to the control port passage 420 of the brake control valve BCV to apply the brakes when transducer BPT senses a brake pipe pressure below approximately 50 PSI.

Once the brake pipe has reached approximately 50 PSI as determined by the transducer BPT, the microcomputer activates the electrical control valve ECV so as to connect passages 422 and 420 to exhaust. This maintains the brake control valve BCV in the shown position with passage 410 connected to exhaust. This maintains the brake cylinder port BCC at exhaust through passages 416, the manual release valve 28, passage 414 and passage 410 and releases the brakes.

Electropneumatic Brake Application and Release

The operation of the car control device 40-1 for electropneumatic brake application release is the same as that described in FIG. 2A. The electrical control valve ECV controls the signal to control passage 420 for the brake cylinder valve BCV which selectively connects its output 410 and subsequently the brake cylinder port BCC to a) exhaust for release, b) blocked to maintain or lap the brake pressure in the brake cylinder or c) application which applies pressure from passage 406 from the emergency reservoir port ERC and the auxiliary reservoir port ARC to its output 410 and subsequently the brake cylinder port BCC. The electrical operation is when the brake pipe being maintained at a constant pressure and the electrical control signals are provided to the car control device 40-1.

Conventional Pneumatic Application Since the car control device 40-1 has replaced the service portion 10 of the brake control valve, it may provide the appropriate response to variations in brake pipe pressure without input from a central controller. Thus, when the car is used in a conventional train, the operator modulates the brake pipe pressure to control the brakes. The car control device 40, senses variation of the brake pipe pressure by the brake pipe transducer BPT and performs the appropriate operation. Since a conventional train does not have a train powerline, the car must have an independent power source.

When the microcomputer senses a service brake application in the brake pipe, it controls the electrical control valve ECV to provide an appropriate signal on passage 420 for the brake cylinder valve BCV to apply the desired pressure to the brake cylinder port BCC. The brake cylinder valve BCV provides air stored in the emergency and auxiliary reservoirs to the brake cylinder. Once the appropriate pressure is provided to the brake cylinder, the microcomputer through the electrical control valve ECV brings the brake cylinder valve BCV to its center or lapped position.

During conventional service brake application, the brake pipe reduction is different depending upon the length of the train and the brake valve handle position. Therefore, it is necessary for the car control device 40-1 to be able to change its brake cylinder build up rate depending upon the brake pipe reduction rate. The car control device 40-1 will control the brake cylinder pressure corresponding to the rate at which the sensed reduction in the brake pipe is made using the electrical control valve ECV. The electrical valve ECV is a analog type of device which provides a control proportional both to its input signals value and its rate of change. The car control device can be designed to mimic the operation of a conventional pneumatic brake control valve at its car. The car control device operation and the resulting operation of the brakes on the car will be no different than the pneumatic only brakes and thus, invisible to the operator.

For an emergency rate of change of the brake pipe pressure sensed by transducer BPT, car control device 40-1 will operate electric control valve ECV and isolation valve EPI to control the brake cylinder valve BCV to apply an emergency application to the brake cylinder port BCC using the emergency reservoir and the auxiliary reservoir. The emergency portion 20 connected to the pipe bracket 30 connects the brake pipe port BP to exhaust in response to an emergency rate of decrease of brake pipe pressure to propagate the emergency brake pipe pressure reduction through the train.

The emergency portion 20 will operate normally to also pneumatically connect the emergency reservoir to the brake cylinder port BC. Thus, the car control device 40-1 must operate the electrical control valve ECV and the isolation valve EPI to move the brake cylinder valve BCV from the position shown in FIG. 2B where the EP brake cylinder port BCC is connected to exhaust to either its middle lap position or to its upper applied position where emergency reservoir pressure is applied to the EP brake cylinder port BCC. Otherwise, the car control device 40-1 will connect the brake cylinder to an exhaust through the emergency portion 20 and try to release the brake. The car control device 40-1 can operate the brake cylinder valve BCV by either using the electrical control valve ECV with the isolation valve EPI activated or deactivating the electric isolation valve EPI and allowing the pilot or emergency valve POV to respond to the brake pipe pressure. This regime for FIG. 2B is necessary since the select valve SEL does not have the ability to select between the brake signal coming from the emergency portion 20 and the output of the brake cylinder valve BCV.

The car control device 40-1 also operates when it is turned off or without power to respond to an emergency brake application. Once the brake pipe pressure is dropped below 50 PSI, the pilot valve POV will assume the position shown in FIG. 2B. This connects the emergency and auxiliary reservoir ports ERC and ARC respectfully to passage 428. With the car control device off, the isolation device EPI is in its shown position which interconnects passage 428 to passage 434 and 420 to control the brake cylinder valve BCV to its third position. This interconnects passage 406, which has the emergency reservoir and auxiliary reservoir connected thereto through to the output passage 410 of the brake cylinder valve BCV. This will apply the full reservoir pressure to the brake cylinder port BCC through the select valve SEL passage 414, release valve 28 and passage 416.

Conventional Pneumatic Release

In response to a conventional release, the increase of the pressure in the brake pipe is sensed by transducer BPT and provided to the microcomputer which controls the electrical control valve ECV to provide an appropriate signal to the brake cylinder valve BCV to reduce the brake cylinder pressure in a full release or graduated release mode. In response to a recharging of the brake pipe after an emergency condition, the pilot valve POV will also change states from its applied position shown in FIG. 2B to its exhaust position after the brake pipe exceeds approximately 50 PSI as previously described.

As a further alternative to FIG. 2B, the emergency portion 20 may be removed a blanking plate placed at an emergency portion interface 32 of pipe bracket 30 as illustrated in FIG. 2C. Also, the car control device 40-1 may operate as a totally stand alone device even without the pipe bracket 30 or a modified pipe bracket illustrated in FIG. 2D. Since the electrical control valve ECV can perform service and emergency applications and release in response to electrical signals and pneumatic signals, the emergency portion 20 is not needed. Also, as previously described, the pilot valve POV being responsive pneumatically to brake pipe pressure can also apply pneumatically in an emergency application if the electronic portion of the car control device 40 is off or inoperable.

If the emergency portion 20 is removed and a blanking plate 56 is provided for the standard pipe bracket 30, a vent valve 54 would have to be connected to the brake pipe as shown in FIG. 2C. The vent valve 54, a Km-2, for example, is responsive to an emergency rate of brake pipe reduction to locally vent the brake pipe. This performs the same propagation function as the emergency portion 20 of a brake control valve. The blanking plate 56 includes a passage 58 interconnecting brake cylinder port C32 and C34 on the emergency portion interface 32 of pipe bracket 30. This connects the brake cylinder port BC and passages C30 and C31 in the pipe bracket 30.

The car control device 40-1 may also be used with a modified pipe bracket 30-1 as illustrated in FIG. 2D. The reservoir 22 may be a single supply reservoir as shown. Thus, there is a single port SR on the pipe bracket 30-1 instead of an emergency port ER and an auxiliary reservoir AR. Also, since there is no service portion, the retainer port RET has also been deleted. The first interface 31-1 with the car control device 40-1 has been simplified to having brake pipe port B31 connected through filter 36 and brake pipe passage B30 to the brake pipe port BP, supply port E31 connected to supply port SR through supply passage E30 and a brake cylinder port C33 connected by passage C30 to the brake cylinder port BC. It should also be noted that the quick action chamber 34 has been deleted. The second interface 321 of the pipe bracket 30-1 includes a vent valve 54 connected to brake pipe port B32. The bracket 30-1 may be provided on newer cars or may be substituted for the standard pipe bracket 30 on existing cars. The operation of the unit is identical to that in FIG. 2C.

Figure 3B:
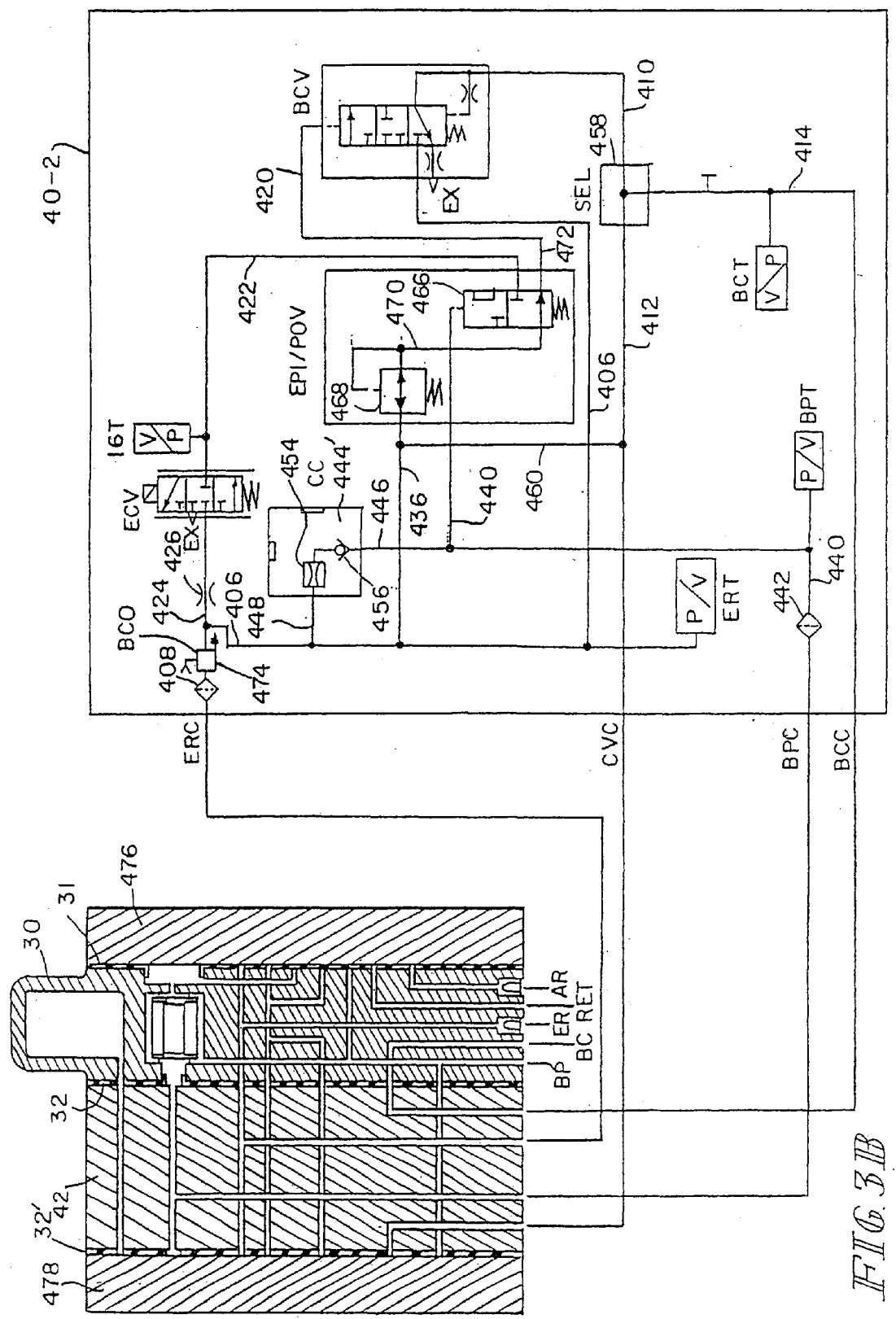

FIGS. 3A and 3B show a second embodiment of the car control device 40-2. Those elements and passages having the same function as that in the first embodiment 40-1 have the same reference numbers. The car control device 40-2 shows the electric control valve ECV as a single three position valve instead of the pair of magnetic valves at 40-1. The two lines along the face of the valves indicated that it is a proportionally positionable valve. The car control device's 40-2 isolation valve EPI, as shown in FIG. 3A, is the pneumatically operated isolation valve 462 instead of electrically operated as in the car control device in 40-1. A passage 460 connects the brake signal port CVC and the passage 412 as the pilot or control for the isolation valve 462. The isolation valve EPI is spring biased to its closed position disconnecting passage 434 and 420 from exhaust. This allows the electrical control valve ECV to operate to control the brake cylinder valve BCV. When a brake control signal appears at port CVC from the brake control valve, it moves the isolation valve EPI from the position shown to its second position which connects passage 434 and 420 to exhaust. This isolates the electrical control valve ECV from operating the brake cylinder valve BCV. Thus, the pneumatic brake control valve takes precedence over the electrical control valve ECV in providing the braking signal to the brake cylinder.

A further modification of the car control device 40-2, is a relief valve 464 connected to passage 414 of the brake cylinder port BCC. Thus, if the brake cylinder pressure becomes excessive, the relief valve 464 will vent some of that pressure to exhaust.

The blanking plate 444' includes not only blanking passages but the charging choke 454 and the charging check 456. In the position illustrated in FIG. 3A, passage 446 from the brake pipe port BPC is blocked and not connected to passage 406 for the emergency reservoir port ERC. Installation of the blanking plate 444' in its second position, as illustrated in FIG. 3B, connects the charging choke 454 and charging check 456 between passages 446 and 406 to allow charging of the emergency reservoir from the brake pipe through the car control device 40-2.

The operation of the car control device 40-2 of FIG. 3A is the same as that for the first embodiment 40-1 of FIG. 2A, except that the isolation valve EPI is pneumatically operated in response to a brake control signal on port CVC. As in FIG. 2A, the car control device 40-2 in FIG. 3A is used in combination with a full brake control valve having service portion 10, emergency portion 20, pipe bracket 30 and adaptor plate 42. As previously discussed, the car control device 40-2 may be connected to the adaptor plate 42 by pneumatic lines 44 or mounted directly thereto and being an integral part thereof.

The car control device 42-B can also be used as a stand alone electropneumatic device. As illustrated in FIG. 3B, the car control device 40-2 is connected through adaptor plate 42 to the pipe bracket 30 at the emergency portion interface 32. The service portion 10 has been replaced by blanking plate 476 and the emergency portion 20 has been replaced by the blanking plate 478. As in the first embodiment for the car control device 41-1, the second embodiment 40-2 replaces the select valve SEL with a blanking plate 458 to connect the output passage 410 of the brake cylinder valve BCV directly to the brake cylinder passage 414. As previously discussed, the blanking plate 444' is rotated so as to connect the charging choke 454 and the charging check 456 between the brake pipe port BPC and the emergency reservoir cylinder port ERC. This allows charging of the emergency reservoir from the brake pipe through the car control device 40-2.

Another modification to the second embodiment to the car control device 40-2 between FIGS. 3A and 3B is that the isolation valve EPI has been modified to be a combined isolation and pilot valve EPI/POV. The isolation valve 462 has been replaced by an isolation valve 466 and regulator valve 468. Valve 466 is a two-position valve responsive to a pilot signal from the brake pipe port passage 440. Regulator valve 468 is connected to the emergency reservoir port ERC via passages 406 and 436. Regulator valve 468 is responsive to emergency reservoir pressure to apply the emergency reservoir pressure via passage 470 as an input to the valve 466.

Valve 466 is responsive to brake pipe pressure at brake pipe port BPC via passage 440. As discussed for the pilot valve POV in the embodiment 40-1, valve 466 is spring biased to connect the emergency reservoir to the brake cylinder valve control port passage 420 to apply an emergency level of brake pressure to the brake cylinder through the brake cylinder valve BCV. Once the brake pipe pressure has exceeded, for example, 50 PSI, valve 466 moves to its second position connecting the output of the electrical control valve ECV and passage 422 to passage 420 to control the brake cylinder valve BCV. Thus, it can be seen that the valve 466 is a combination of the isolation valve EPI and the pilot valve POV of the first embodiment illustrated in FIG. 2B. Also, since it is responsive to an emergency condition in the brake pipe to apply the brake, it can be considered an emergency application valve.

Thus, the second embodiment of the car control device 40-2 in FIG. 3B operates the same as the first embodiment 40-1 illustrated in FIG. 2-B. The major exception being that there is no emergency portion 20 connected to the pipe bracket 30 and the car control device 40-2 is connected to the pipe bracket using the adaptor plate 42 instead of being connected directly at the service portion interface 31. As previously discussed, since the emergency portion is not available, a vent valve 54 must be provided. The second embodiment 40-2 may also be operated in combination with an emergency section and therefore no vent valve would be required. Similarly, the second embodiment 40-2 can be modified to be mounted directly to the service interface 31 of the pipe bracket. As in the first embodiment of 40-1, a port would have to be provided for the auxiliary reservoir such that it could be charged from the brake pipe. Similarly, if desired, the manual release interface could have to be added to the embodiment 40-2. The embodiment of FIG. 2B for the car control device 40-1 may be modified to remove the manual release valve 28. It should be noted in FIG. 3B that the relief valve 464 has been removed and its port blanked.

Figure 4A:
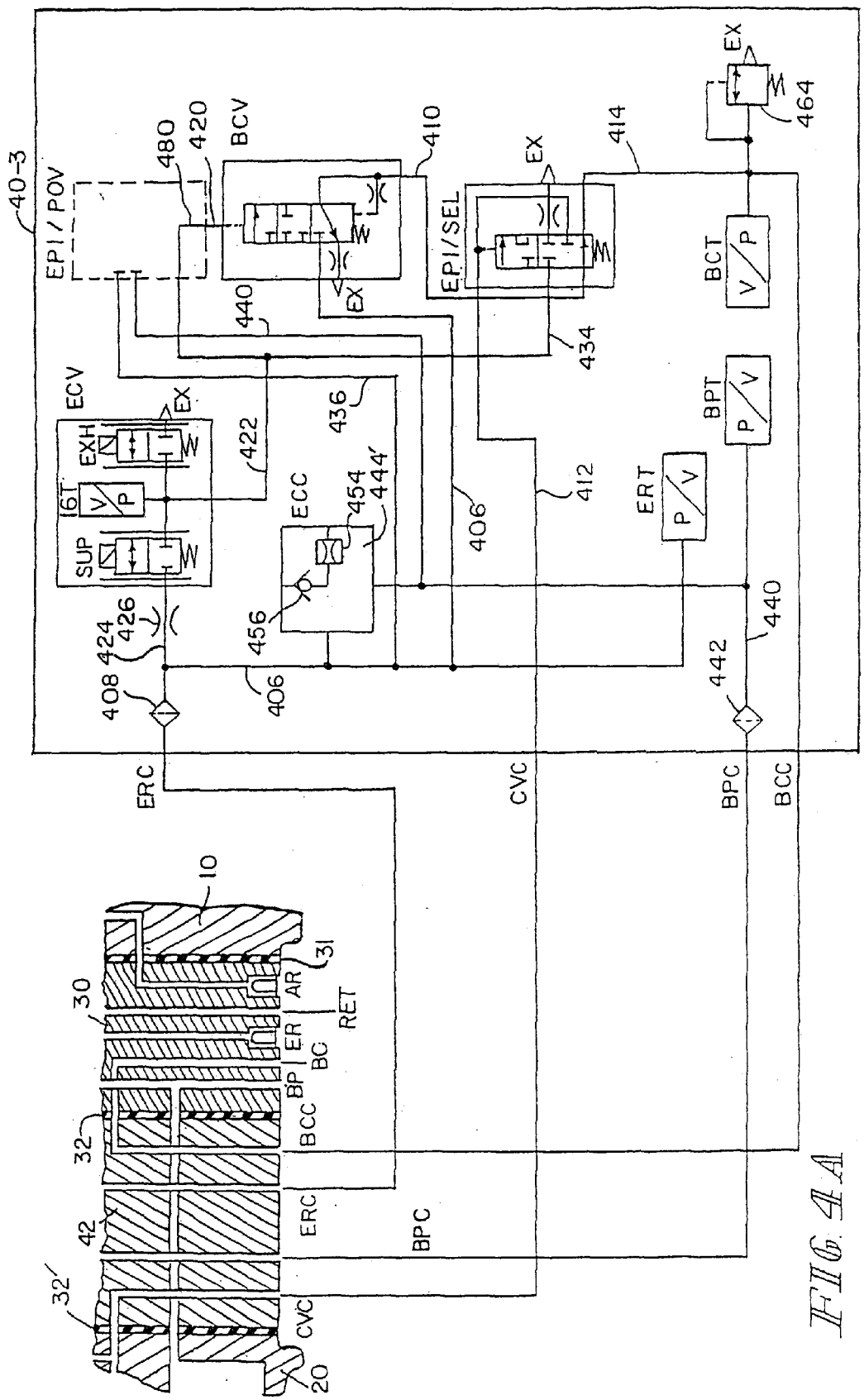
FIGS. 4A and 4B are schematics of a third embodiment of an electropneumatic retrofit unit for a full pneumatic brake control valve connected at the emergency interface of the pipe bracket in combination with a complete brake control valve and only the pipe bracket respectively.
Figure 4B:
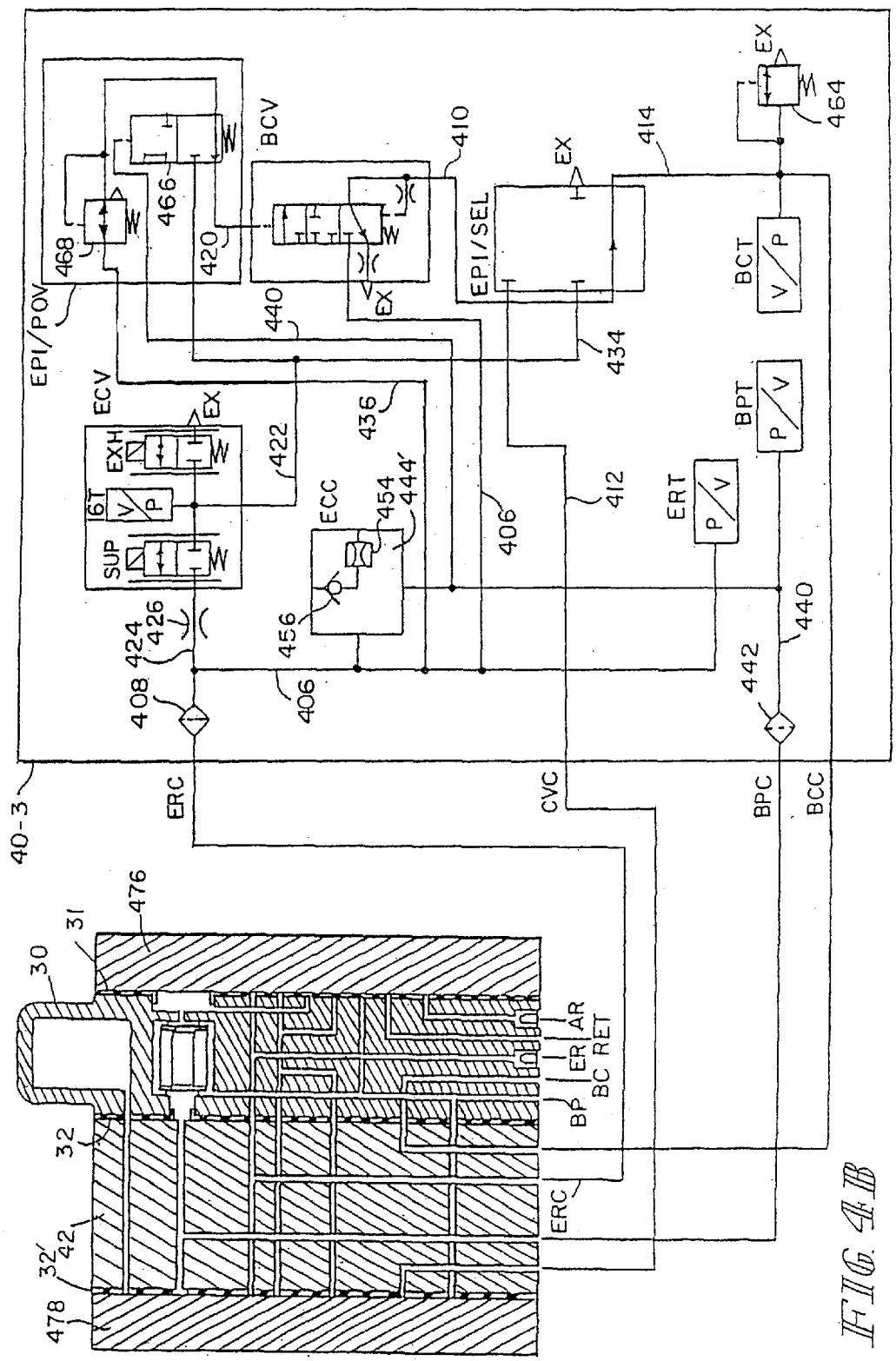

A third embodiment of the car control device 40-3 is illustrated in FIGS. 4A and 4B. The third embodiment 40-3 is similar to the second embodiment 40-2 in that it is designed for use with the adaptor plate 42 and not specifically for use on the service interface 31 with the pipe bracket. Thus, the porting for the auxiliary reservoir and the manual release valve are not provided. As with the previous embodiment, car control device 40-3 can be modified to provide this additional porting. Although the third embodiment 40-3 uses a pair of magnetic valves for the electrical control valve ECV versus a single valve illustrated in embodiment 40-2, either type of electrical control valve may be used. The major distinction between the third embodiment 40-3 and the second embodiment 40-2 is that in 40-3 the isolation valve EPI and the selection valve SEL have been combined into a single valve. The third embodiment 40-3 also incorporates the combined isolation and pilot valve EPI/POV in FIG. 4B as the second embodiment 40-2 in FIG. 3B.

As illustrated in FIG. 4A, the car control device 40-3 is connected to the adaptor plate 42 in combination with a complete pneumatic brake control valve. Thus, the pilot valve POV is not needed in a blanking plate 480 is provided connecting the output passage 442 of the ECV valve directly to the control passage 420 for the brake cylinder valve BCV. The blanking plate 480 blanks the passage 440 from the brake pipe port BPC and passage 436 from the emergency reservoir port ERC. The combined isolation select valve EPI/SEL is responsive to the pressure from the brake signal port CVC and passage 412 to simultaneously select the brake signal at port CVC and passage 412 over the signal from the brake cylinder valve BCV and passage 410 to be connected to its output passage 414 for the brake cylinder port BCC and to connect passage 434 which is connected to the control passage 420 of the brake cylinder valve BCV to exhaust. This prevents the electric control valve ECV from operating the brake cylinder valve BCV. The EPI/SEL valve is shown in its first position where there is no brake signal or pressure on brake signal port CVC and passage 412. This connects the output 410 from the brake cylinder valve BCV to the brake cylinder port BCC through passage 414. The passage 434 connected to the control passage 420 for the brake cylinder valve BCV is blanked.

As illustrated in FIG. 4B, the third embodiment 40-3 may also be used as a stand alone valve wherein blanking plates 476 is substituted for the service portion and blanking plate 478 is substituted for the emergency section 20. As previously described for the second embodiment 40-2, the emergency portion may be provided to act as a vent valve responsive to emergency brake pipe pressure. If the blanking plate 478 is used, a brake pipe vent valve 54 must be provided. In this embodiment, the combined isolation select valve EPI/SEL is removed and a blanking plate 482 is provided. The blanking plate 482 directly connects the output passage 410 of the brake control valve BCV to the passage 414 connected to the brake cylinder port BCC. The passage 412 from the brake signal port CVC and passage 432 are blanked.

Also, the blanking plate 480 is removed for the combined isolation and pilot valve EPI/POV. The valves 466 and 468 are provided as the combined isolation pilot valve EPI/POV. This is the same structure as in the second embodiment 40-2 illustrated in FIG. 3B. Thus, the operation is the same to control the brake cylinder valve BCV either electrically in total or pneumatically in response to an emergency brake pipe application.

Figure 5A:
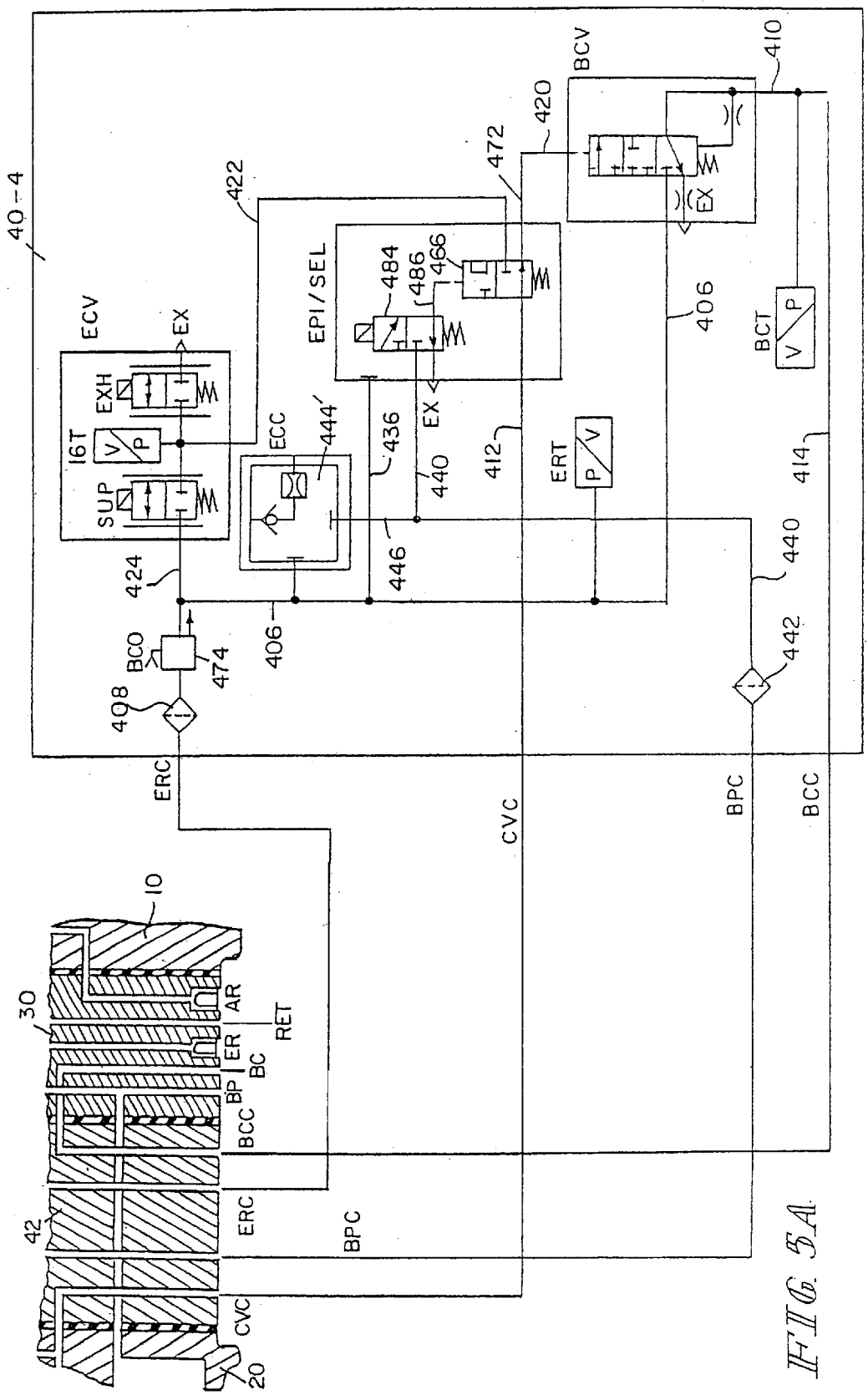

FIGS. 5A and 5B illustrate a fourth embodiment of the car control valve 40-4. As in the third embodiment 40-3, illustrated in FIGS. 4A and 4B, the select valve SEL is either eliminated or combined with the isolation valve EPI. In Figure SB, the pilot valve and isolation valve are combined as EPI/POV in FIG. 4B. The major difference between the car control device 40-4 and 40-3 is that the combined isolation select valve EPI/SEL is provided in the same location as the combined isolation pilot valve EPI/POV. Thus, the isolation select valve EPI/SEL in embodiment 40-4 select the brake signal on port CVC or the signal from the electric control valve ECV as the control signal for port passage 420 of the brake cylinder valve BCV. The valve 466 is the same pneumatic valve as part of the EPI/POV valve in FIGS. 3B and 4B. In its first position, valve 466 connects the brake signal port CVC directly through to the control passage 420 of the brake cylinder valve BCV and blanks the port for the output passage 422 of the electric control ECV.

An electrical valve 484 is spring biased to a first position connecting the control port or passage 486 of the valve 466 to exhaust. When activated, the valve 484 connects the control passage 486 for valve 466 to the brake pipe passage 440. Thus, when 484 is activated, a minimum value of brake pipe pressure for example, 50 PSI through passages 440 and 486 will move valve 466 to its second position connecting the output passage 422 of the electrical control valve ECV to the control port passage 420 of the brake cylinder valve BCV. The brake signal passage 412 is blocked in this second position of the valve 466. Thus, the electrical valve 484 in combination with the brake pipe pressure acts as the isolation portion of the combined isolation/select valve EPI/SEL. When deactivated, valve 466 isolates the output 422 from the electric control valve ECV from the brake cylinder valve BCV.

As illustrated in FIG. 5B, the valve 468 is substituted for the valve 484 to produce combined isolation and pilot valve EPI/POV. The circuit in FIG. 5B for the fourth embodiment of the car control device 40-4 is structural and operationally identical to that in FIG. 4B for the third embodiment 40-3.

Figure 6A:
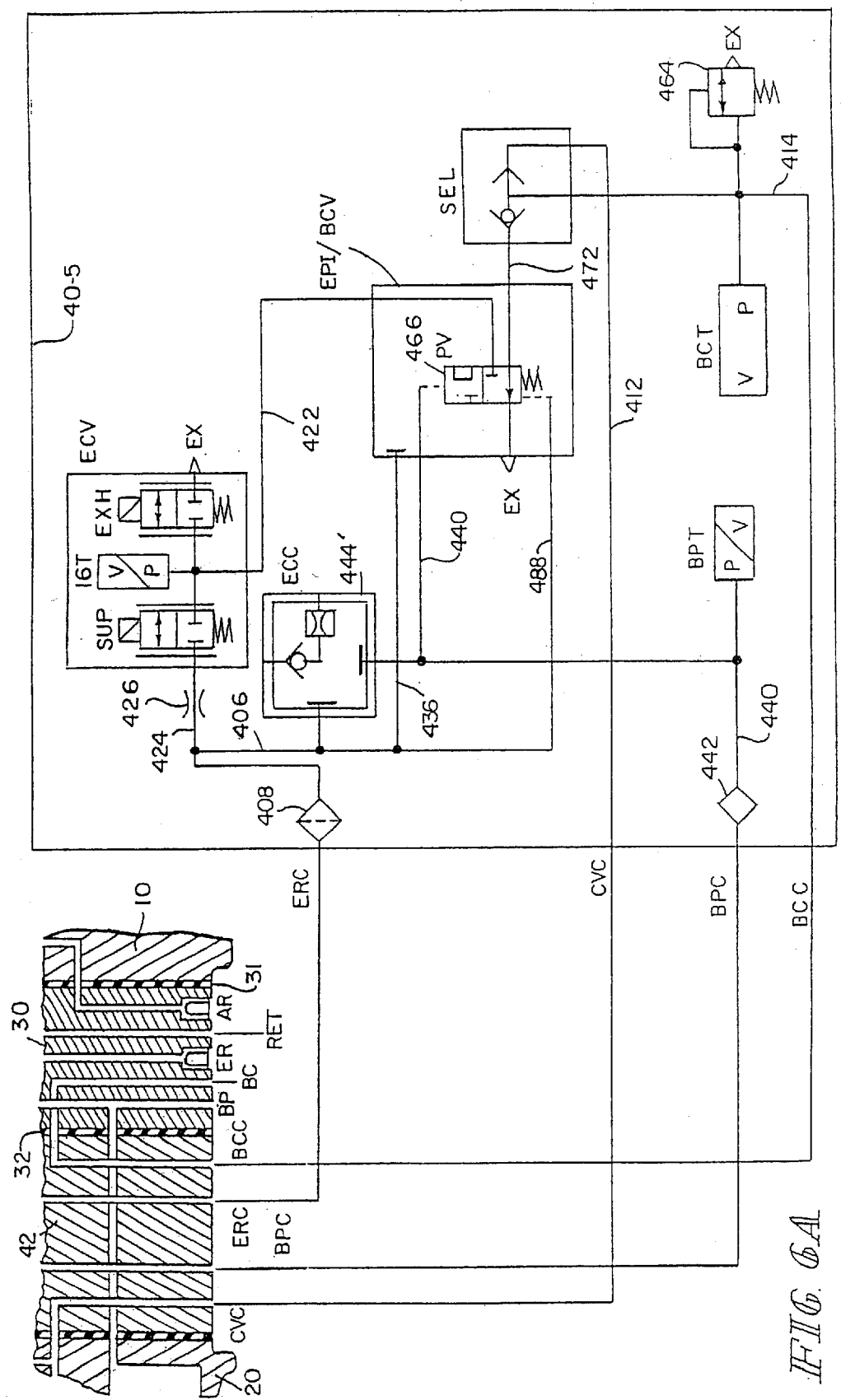
FIGS. 6A and 6B are schematic representations of a fifth embodiment of an electropneumatic retrofit unit for pneumatic brake control valves connected at the emergency portion interface of the pipe bracket in combination with a complete brake control valve and a pipe bracket only respectively.
Figure 6B:
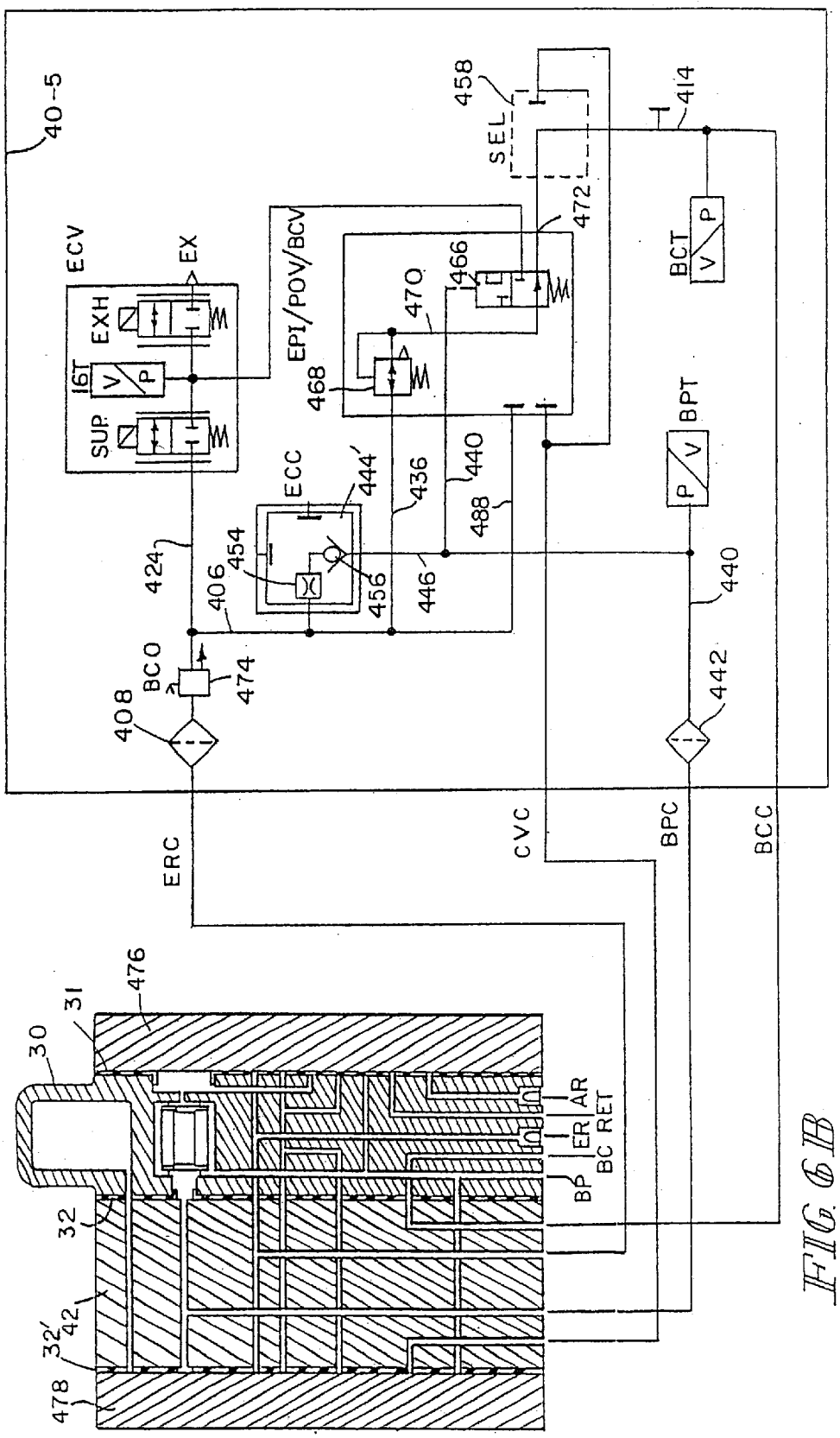

FIGS. 6A and 6B illustrate a fifth embodiment of the car control device 40-5. This fifth embodiment differs from the other embodiments in that it does not use a brake cylinder valve BCV. The output passage 422 of the electrical control valve ECV is connected to the isolation valve EPI which is shown including the valve 466. The isolation valve EPI is a pilot valve which is spring biased to a first position (shown) where its output 472 is connected to the exhaust and the output passage 422 of the electric control valve ECV is blocked. The brake pipe port BPC is connected as one of the control ports passage 440 of the valve 466. This is balanced against the spring and a passage 488 which is a pilot pressure from the emergency control port ERC. When the brake pipe is fully charged initially or after a release, the valve 466 is moved to a second position which connects the output passage 422 of the electric control valve ECV to the output 472 of the valve 466. When the brake pipe pressure is reduced to produce a conventional braking signal, the isolation valve EPI moves to the first position shown cutting off the electric control valve ECV from the output 472. The output 472 of the isolated valve EPI is connected to the select valve SEL, which is connected to exhaust, to be compared against the brake signal on brake signal port CVC. The higher of the two is provided on passage 414 which is connected to the brake cylinder port BCC.

The EPI valve 466 of FIG. 6A provides a pneumatic means of allowing a conventional application or release to be made by the conventional control valve thru the "SEL" valve. This car control device 40-5 does not provide the previous feature of 'protecting' against an inadvertent brake application by the electrical control valve ECV. Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An electropneumatic retrofit unit for a pneumatic brake control valve having a pipe bracket and an emergency brake portion and a service brake portion connected to said pipe bracket at first and second faces, said pipe bracket having passages connecting a brake pipe port, a brake cylinder port and an emergency reservoir port to said faces, the retrofit unit comprising:

a plate for mounting at and sealing said first face; and a unit for mounting at said second face and including an electrical control valve, connected to said passage for said emergency reservoir port, a venting port and an output port when said unit is mounted, for selectively connecting said output port to said venting port for releasing a brake or to said emergency passage for applying said brake, and a pneumatic emergency valve, responsive to pressure in said passage for said brake pipe, for selectively connecting said passage of said brake cylinder port with said passage of said emergency reservoir port in response to an emergency signal in said brake pipe port passage and connecting said brake cylinder port passage with said output of said electrical control valve in absence of said emergency signal in said brake pipe port passage, when said unit is mounted.

2. A retrofit unit according to claim 1, including a regulating valve connecting said emergency reservoir port passage to said pneumatic emergency valve.

3. A retrofit unit according to claim 1, including a charging choke and check valve connecting said brake pipe port passage to said emergency reservoir port passage for charging an emergency reservoir from said brake pipe through said unit.

4. A retrofit unit according to claim 1, including electronics on said unit for operating said electrically controlled valve, and transducers connected to said electronics for sensing pressure in said outlet of said electrical control valve and in said brake cylinder port passage.

5. A retrofit unit according to claim 4, including transducers connected to said electronics for sensing pressure in said brake pipe port passage.

6. A retrofit unit according to claim 1, wherein said second face is the face to which said emergency portion will be connected.

\* \* \* \* \*